US010173699B2

(12) United States Patent
Cylvick

(10) Patent No.: US 10,173,699 B2
(45) Date of Patent: Jan. 8, 2019

(54) TANDEM-TROLLEY, ZIP-LINE SYSTEM AND METHOD

(71) Applicant: ZIPHOLDINGS, LLC, Wanship, UT (US)

(72) Inventor: Eric S. Cylvick, Wanship, UT (US)

(73) Assignee: ZIPHOLDINGS, LLC, Wanship, UT (US)

( * ) Notice: Subject to any disclaimer, the term of this patent is extended or adjusted under 35 U.S.C. 154(b) by 176 days.

(21) Appl. No.: 15/354,866

(22) Filed: Nov. 17, 2016

(65) Prior Publication Data

US 2017/0144678 A1     May 25, 2017

Related U.S. Application Data

(60) Provisional application No. 62/257,610, filed on Nov. 19, 2015.

(51) Int. Cl.
    *B61H 9/02*      (2006.01)
    *B61B 7/00*      (2006.01)
    *B61B 12/00*     (2006.01)

(52) U.S. Cl.
    CPC .............. *B61H 9/02* (2013.01); *B61B 7/00* (2013.01); *B61B 12/002* (2013.01)

(58) Field of Classification Search
    CPC ......... B61B 7/00; B61B 12/00; B61B 12/002; B61B 12/005; B61B 12/007; B61H 9/02
    See application file for complete search history.

(56) References Cited

U.S. PATENT DOCUMENTS

| | | | |
|---|---|---|---|
| 6,622,634 B2 * | 9/2003 | Cylvick | A63G 21/22 104/53 |
| 6,666,773 B1 * | 12/2003 | Richardson | A63G 21/22 104/204 |
| 7,299,752 B1 | 11/2007 | Cylvick | |
| 7,404,360 B2 * | 7/2008 | Cylvick | B61B 7/02 104/112 |
| 7,637,213 B2 | 12/2009 | Cylvick | |
| 7,837,213 B2 * | 11/2010 | Colegrove | B62K 25/04 280/284 |
| 7,966,940 B2 * | 6/2011 | Cylvick | A63G 21/22 104/113 |
| 2011/0083577 A1 * | 4/2011 | Tilley | B61B 7/06 104/96 |

(Continued)

*Primary Examiner* — Jason C Smith
(74) *Attorney, Agent, or Firm* — Pate Baird, PLLC

(57) ABSTRACT

A canopy tour system follow a route including multiple legs of track line, and may run multiple track lines in parallel along each leg, establishing the route of descent. Each leg extends between an associated upper station and lower station, used for loading, launching, receiving, and unclipping, respectively, riders of trolleys on the zip lines. A system of mechanical and electronic interlocks provides safety for users in remote locations, enabling individual riders to operate trolleys, including attaching and dis-attaching the trolleys from various track lines, unattended by other workers or employees of the canopy tour operation. Multiple trolleys may travel simultaneously and in close proximity to one another as a group on a single line. Each group traveling together is controlled by a single braking trolley ahead, behind, or in the midst of the group.

19 Claims, 26 Drawing Sheets

(56) References Cited

U.S. PATENT DOCUMENTS

| | | | |
|---|---|---|---|
| 2013/0220743 A1* | 8/2013 | Headings | B61H 9/02 188/65.1 |
| 2016/0038841 A1 | 2/2016 | Cylvick | |
| 2016/0046305 A1 | 2/2016 | Cylvick | |
| 2016/0096532 A1 | 4/2016 | Cylvick | |
| 2017/0144678 A1* | 5/2017 | Cylvick | B61H 9/02 |
| 2017/0157433 A1* | 6/2017 | Cylvick | A62B 1/20 |
| 2017/0327129 A1* | 11/2017 | Cylvick | B61B 7/00 |

* cited by examiner

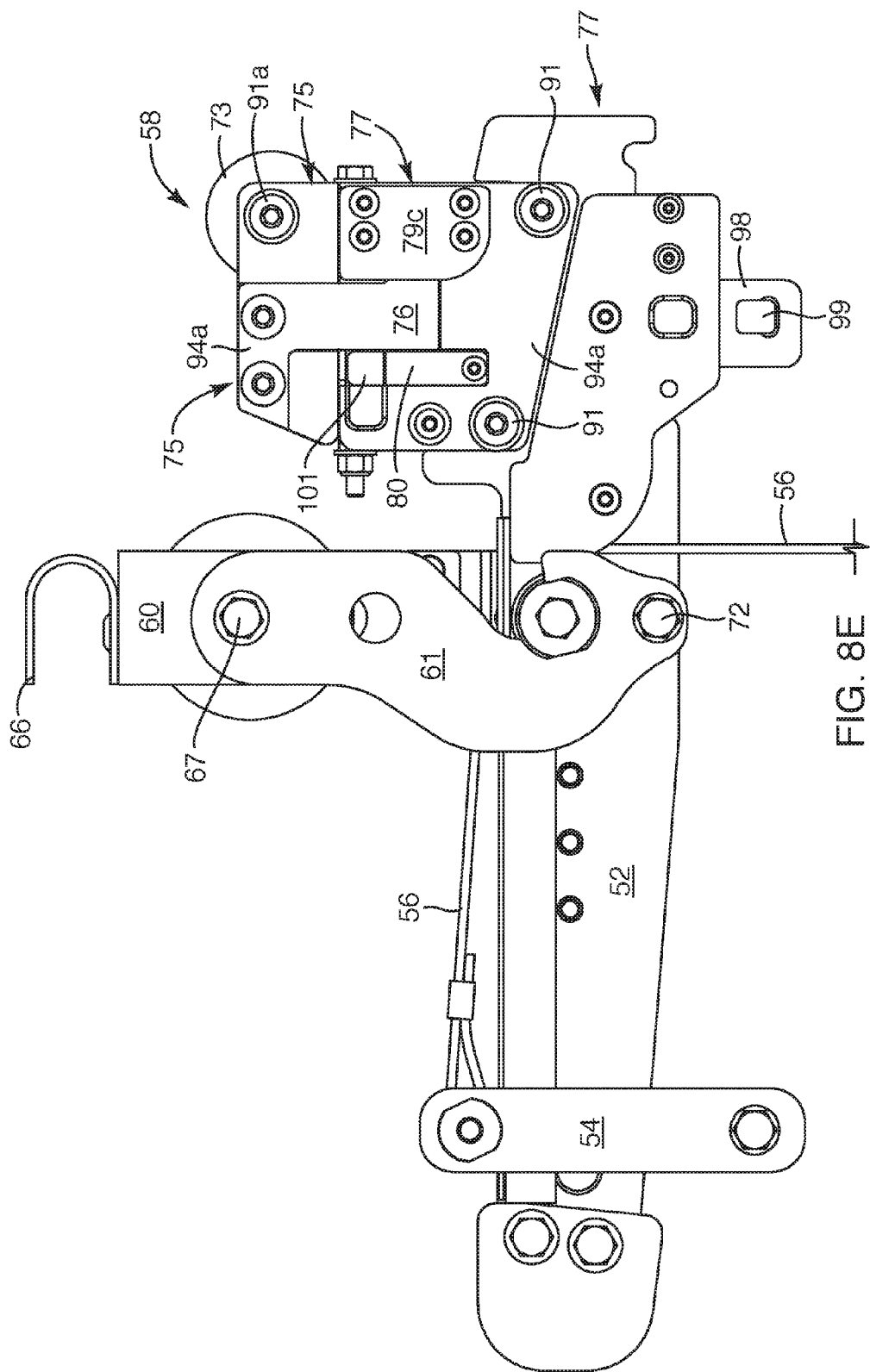

TANDEM-TROLLEY, ZIP-LINE SYSTEM AND METHOD

RELATED APPLICATIONS

This application claims the benefit of U.S. Provisional Patent Application Ser. No. 62/257,610, filed Nov. 19, 2015, which is hereby incorporated by reference. This application also incorporates herein by reference the following applications and patents: U.S. patent application Ser. No. 14/451,932, filed Aug. 5, 2014; U.S. patent application Ser. No. 14/711,465, filed May 13, 2015; U.S. Provisional Patent Application Ser. No. 62/058,544, filed Oct. 1, 2014; and U.S. patent application Ser. No. 14/923,708, filed Oct. 27, 2015. Moreover, this application hereby incorporates herein by reference U.S. Pat. No. 7,637,213, issued Dec. 29, 2009; U.S. Pat. No. 7,966,940, issued Jun. 28, 2011; U.S. Pat. No. 7,299,752, issued Nov. 27, 2007; U.S. Pat. No. 7,404,360, issued Jul. 29, 2008; U.S. Pat. No. 6,622,634, issued Sep. 23, 2003; U.S. Pat. No. 6,666,773, issued Dec. 23, 2003; U.S. Pat. No. 8,191,482, issued Jun. 5, 2012; U.S. Pat. No. 8,333,155, issued Dec. 18, 2012; and U.S. patent application Ser. No. 14/451,932, filed Aug. 5, 2014.

BACKGROUND

Field of the Invention

This invention relates to amusement rides and, more particularly, to novel systems and methods for zip lines.

Background Art

The word "zipline" and words "zip line" refer to a line or wire rope, typically, suspended between two supports. The zip line necessarily contains no intervening supports. It relies on gravity, and always gravity at the beginning. It may also rely on a rider drawing the cable past a trolley by hand-over-hand grasping and pulling on the wire rope. That motion is relative, whether the cable is fixed or not. In some instances, an attendant on the ground below a zip line may draw a rider and trolley along a zip line, at least an uphill portion near the lower end thereof, in order to move the rider along.

Adventure stories, movies, military operations, and the like may rely on zip lines as lightweight, temporary mechanisms for crossing a space, such as a river or gorge.

An individual rider may use a gloved hand for their own braking. One may move along a cable or line by grasping the overhead line with a gloved hand. In other instances, a long braking rope extends downward to be grasped at an appropriate time and place by an operator below. The operator grips the rope to restrain or to exert force on a rider, thereby slowing the rider from crashing into the lower anchor on the ride.

Such systems are not cost effective in many applications. Labor costs at amusement parks, populated by a large cadre of trained personnel managing the machinery of the rides are not practical without high throughput. Any installation with limited throughput (no long waiting lines with attendants everywhere) in or near wilderness, observing nature, in an exotic location, offering solitude, or the like will have a labor problem. Any possible change to rider infrequency, rider election of pace and speed, stopping to view a natural setting, a remote location, comparative solitude, and the like will create safety risks, may be a serious safety problem.

In addition, Zip lines have traditionally been a solo ride device. Brakes accessible to a rider have been largely absent. An ability of a supervisor to assist or control a novice rider have been absent. Any ability to have multiple riders on a single line safely has likewise been absent.

What are needed are apparatus, systems, and methods that could render practical, safe, and economical the unattended use of zip lines deployed in multiple courses or "legs" as a tour. Moreover, it would be an advance to provide a mechanism and method for an experienced rider to accompany others, control their descent, and be present with them on descent.

BRIEF SUMMARY OF THE INVENTION

In view of the foregoing, in accordance with the invention as embodied and broadly described herein, a method and apparatus are disclosed in one embodiment of the present invention as including a set of anchors, which may be secured atop towers or elevated positions calculated to provide clearance above underlying foliage and terrain. The towers may operate as spacers away from obstructions below that might interfere with or injure a rider.

A platform at an upper tower and cable or anchor for launching and a corresponding lower platform, tower, and anchor for landing are provided with each zip line. Sometimes, zip lines may be concatenated. That is, the lines are not necessarily connected. Indeed, a pulley or trolley cannot pass through an anchor in descent. Such a system would create inordinate danger.

However, a single anchor may have a platform associated with an incoming line and thus act as a terminal station. That platform or another some distance away, may serve as the launch platform for launching the same rider on another zip line constituting another leg of the canopy tour. Thus, such canopy tours may be constituted by courses or sequences on zip lines.

Secured to and by each tower is a line, typically a wire rope as that term is understood in the engineering and manufacturing art. Industry has long used woven strands of twisted wire having comparatively high strength and a comparatively low elongation under load. Often this is referred to as cable, but the term "cable" typically refers to a bundle of wires, often electrical wires. Nevertheless, cable is not an improper term for a wire rope. A cable is typically suspended in a catenary between two adjacent anchors. All points between two towers may be free of support. In some embodiments, hardware may permit cable supports to be traversed by a trolley on the cable.

Cables may be monotonically tilting downward, may be level, or may be freely suspended with upward and downward angled portions of a catenary suspension. An upper anchor will serve as a launch location while the lower anchor will be associated with the landing location.

In one embodiment of an apparatus and method in accordance with the invention, a series of zip lines is concatenated in space, whether or not literally interconnected. Rather, the routes traversed by the zip lines are virtually concatenated such that a rider may traverse one course or path between a first anchor and a second anchor. A rider may then exit or otherwise leave the landing platform and either connect to a new course or leg of the tour or go wandering, hiking, exploring, or the like for some period of time. Again, this long period of unattended time at a remote location is unheard of in prior art systems as simply intolerable from a labor standpoint and from a safety, throughput, training, or other administrative standpoint.

Accordingly, an apparatus, system, and method in accordance with the invention may rely on sensors, safety interlocks, instructions, basic training, or changes to hardware connections. They may operate by rendering removable certain devices and apparatus that have previously been fixed or undetachable from other components. They may render non-removable certain components that have previously been attached or attachable only by skilled attendants. They may use simplified equipment. They may rely on providing warnings, providing multiply dependent functionalities that protect against misuse, improper use, or nonuse of safety mechanisms, and so forth.

In one embodiment of an apparatus and method in accordance with the invention, a launch platform has associated therewith a deck on which a user may comfortably stand or move about. A launch block secured to the main track line or carrier (cable, wire rope) is responsible to register a trolley mechanically and electronically for launching from the launch platform.

Similarly, a landing platform may be configured with a deck on which a rider may disembark from the harness or seat suspended from a trolley on the overhead track line. The arrival is registered electronically for safety at several levels. A velocity or momentum attenuator may exist approaching the terminal or landing platform in order to brake the speed of a rider approaching that platform.

Meanwhile, at the launch end, a release, a set of electronic and mechanical safety interlocks, and the like operate according to central supervisory computers. Safety interlocks assure that the trolley above a user (which will support that rider) cannot roll down the line while the rider is attaching thereto. Likewise, other interlocks may be associated by shared computer control with the trolley, the launch block, or both.

For example, gates that are selectively openable and closable, may be arranged to slide back and forth laterally (side to side), vertically (up and down), pivot (in and out), or rotate (e.g., around a vertical axis) in turnstile fashion. They may be counterbalanced, drawn by cables, mechanized with a four-bar linkage, gear driven, or the like.

Gates may be interlocked so as to be openable by a user only after safety criteria (e.g., no interference with other riders) or administrative criteria (e.g., authorization and payment) are satisfied. For example, a next rider may be required to close a counter-balance opening gate enabled only after a previous rider has exited a launch deck or landing deck. Gates may also be interlocked with restraints securable to the track line to a secure rider.

For example, in order to open a gate, one may be required to pass one or more tests. Interlocks may be required to report in. A rider may be required to place the line into the proper position with respect to the trolley, close the frame with a link or with a bail, and lock the frame against accidental release. Only then does the trolley fit the launch block. Only then can the trolley register properly with the launch block. Only then does a sensor authorize the next steps. Such a configuration is provided with instructions, warnings, signs, and initial training.

However, the procedure of operation is sufficiently simplified that there is comparatively little to remember. Thus, a simple process, straightforward training, reminders, and interlocks will not permit a rider to leave the platform less than safely. At launch various systems interlock to protect against accident, injury, misuse, damage to the equipment, and so forth.

In certain embodiments, a system of sensors is provided with unique identifiers for each rider. Thus, electronic sensors detect, track, and report the presence, arrival, and departure of each individual user to and from each individual station, whether launching or landing. Electronic safety lockouts or locks do not permit a new rider to traverse a line or leg of a tour until after the last previous rider has safely left. Each rider thereon is detected to arrive at the landing, and exit that area of the landing deck designated for stopping, standing, unclipping from the line, and so forth. In certain embodiments, this electronic locking operates to prevent a following rider approaching a launch platform from even entering the launch region of the launch platform "upstream" of a rider on the track line or still in the landing area.

In other embodiments, in order to increase throughput, the lock system permits entry onto the launch platform, clipping in, connecting all hardware, and confirming all the security mechanisms and processes, even when the corresponding landing platform below is occupied. However, the system does not permit exit from the launch platform by the following rider, until the line and the landing platform are clear below.

In other embodiments, the trolley and launch block may have a mating engagement that provides for positioning, registration in one, two, or three dimensions or directions. They may include mechanical interlocks that prohibit or restrain a user from fully clipping in, from launching, or both. They may require that certain fittings have been matched, secured, and verified to be at their proper locations, distances, and so forth. Many details of these mechanisms are disclosed in the references incorporated herein by reference hereinabove.

In certain embodiments, a single rider may be harnessed or seated in suspension below a trolley having a braking system operable by that rider. In variations of this embodiment, another rider or multiple other riders may be linked by slings, carabiners, bumpers, or a combination thereof to descend together in close proximity, typically with trolleys touching. Moreover, such embodiments are most safe and simplest to operate if a single rider has braking control. Thus, a more experienced rider, such as a supervisor with a team of riders, trainer with one or several trainees, adult with accompanying children, or the like may ride a braked, operator controlled trolley while also controlling a train of trolleys running in front, behind, or divided front and back.

BRIEF DESCRIPTION OF THE DRAWINGS

The foregoing features of the present invention will become more fully apparent from the following description and appended claims, taken in conjunction with the accompanying drawings. Understanding that these drawings depict only typical embodiments of the invention and are, therefore, not to be considered limiting of its scope, the invention will be described with additional specificity and detail through use of the accompanying drawings in which:

FIG. 8E is a left side elevation view thereof;

DETAILED DESCRIPTION OF THE PREFERRED EMBODIMENTS

Figure 1:
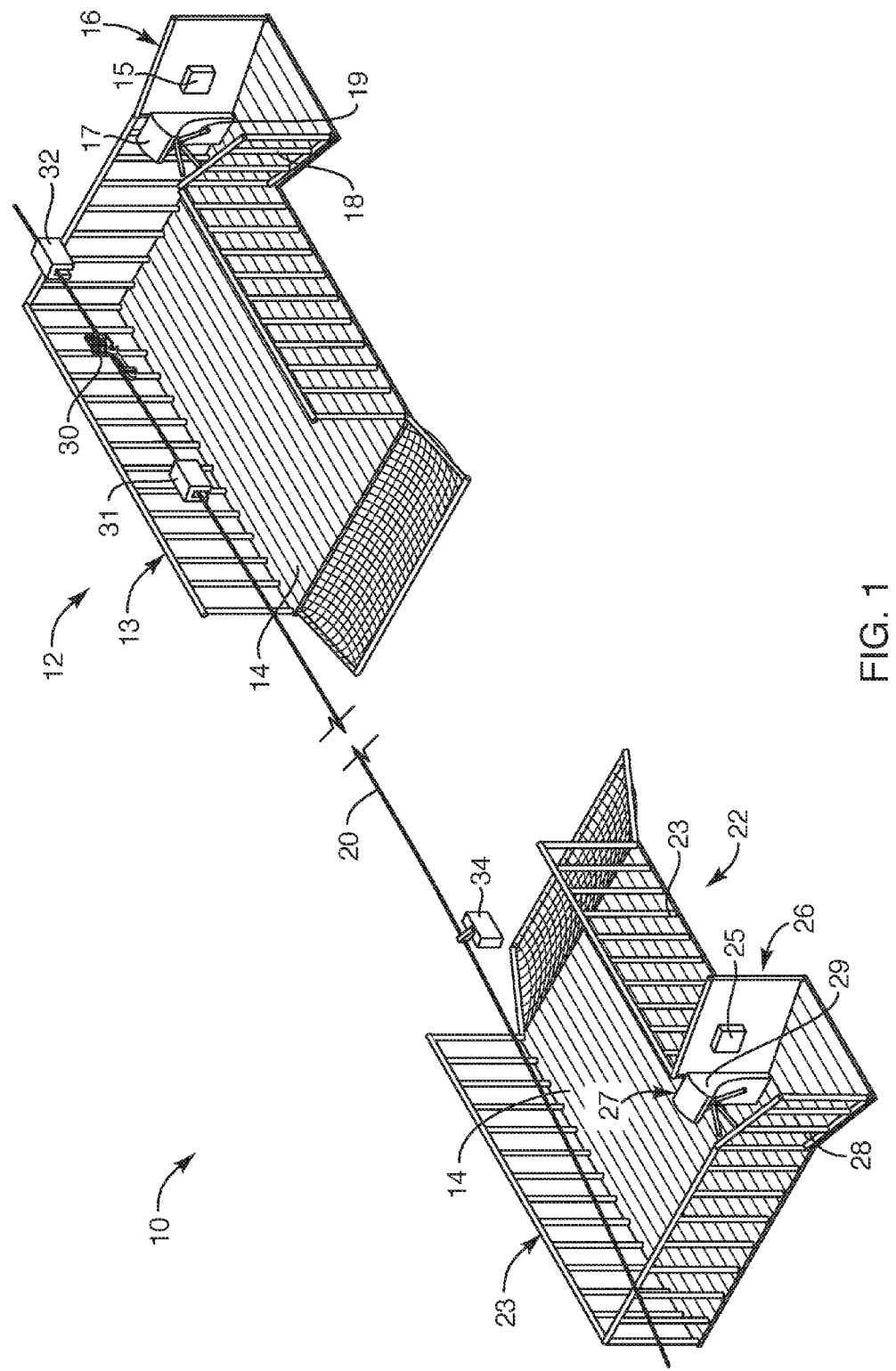
FIG. 1 is a perspective view of upper and lower stations for launching and landing, respectively, in a system in accordance with the invention.

It will be readily understood that the components of the present invention, as generally described and illustrated in the drawings herein, could be arranged and designed in a wide variety of different configurations. Thus, the following more detailed description of the embodiments of the system and method of the present invention, as represented in the drawings, is not intended to limit the scope of the invention, as claimed, but is merely representative of various embodiments of the invention. The illustrated embodiments of the invention will be best understood by reference to the drawings, wherein like parts are designated by like numerals throughout.

A zip line may extend as a catenary, as defined in the engineering art. The term "catenary" is understood by repair to any textbook on structural mechanics or engineering nomenclature. The catenary extends from an upper anchor point to a lower anchor point, the decline of the line providing the gravitation motivation of a rider suspended from a trolley. The trolley may be as simple as a single wheel or pulley in a frame, from which frame is suspended a harness, seat, handle, or the like from which a rider is suspended.

Zip lines may simply be deployed, lightweight, temporary mechanism for crossing a space that is otherwise resistant to traverse. For example, crossing a river, gorge, or the like, a zip line may provide for transport of materiel, personnel, and so forth. Zip lines have a few inherent difficulties in installation and operation. For now, the details of installation are not of concern with respect to the instant application.

On the other hand, the difficulties of operation are substantial. For example, a soldier trained to use a zip line may undergo hours or days of training. An individual who relies on zip lines in an industrial, military, or other routine context will not only have trained intensely but will have extensive experience.

However, in recent years, zip lines may have utilitarian function or an entertainment function. Children's youth camps, Boy Scout™ camps, high-adventure camps, "challenge courses" offered by industry to executive teams for team-building purposes, amusement parks, ski resorts looking for additional amusements that do not require snow, and so forth are possible locations for installing zip lines.

To a certain extent, the amusement-ride, zip lines may have obtained their most significant start in second and third world countries where manual labor was more readily available. The rides could be installed easily and operated by a plentiful labor force.

For example, it is not uncommon to have an individual rider responsible for their own braking to slow their descent on a zip line by grasping the overhead line with a gloved hand. In other instances, a long braking rope extends downward to be grasped at an appropriate time and place by an operator below. The operator grips the rope to restrain or to exert force on a rider, thereby slowing the rider from crashing into the lower anchor on the ride.

A new development in accordance with the invention makes these approaches not cost effective. Labor costs are a significant portion of most businesses. Amusement rides, such as amusement parks, are populated by a large cadre of trained personnel managing the machinery of the rides. Others repair and maintain machinery. Others are handling the attendees, instructing, remonstrating with, and otherwise protecting riders, and so forth.

The throughput rates common to urban-accessible, amusement parks reflect the large draw from a large population base. The routine nature of the operations makes for comparatively lower cost, lower skill, and highly available attendant populations.

However, an interest in wilderness, nature, exotic locations, solitude, and the like has given rise to canopy tours. A canopy tour refers to a system of zip lines that extend across certain regions of a forest canopy. Thus the word "canopy" arises in the term "canopy" tour. Typically, in a "canopy tour" environment, zip lines are installed just under a canopy or layer of foliage in a rain forest, jungle, or the like.

These share a common problem of labor. Labor is a significant cost. The nature of rider infrequency, rider election of pace and speed, a natural setting, a remote location, comparative solitude, and the like will create safety risks and a serious labor problem. How can an operation provide a cost-effective canopy tour experience for riders who are not lined up in crowds as at an amusement park? The labor cost of maintaining attended stations at every landing and every launch is simply cost prohibitive. The safety risk of unattended stations is untenable.

Referring to FIG. 1, a system 10 in accordance with the invention may include an upper station 12 from which riders will launch on a zip line ride. In the illustrated embodiment, an upper station 12 includes a safety structure 13, such as a railing 13, fence 13, or the like. The railing 13 surrounds virtually on all sides, an upper deck 14. The exit for launching a trolley may have a net, gate, or both to provide proper egress but assure safety against falling from the deck 14. The upper deck serves as the staging space 14 for a rider to harness up, clip in to the system 10 and launch on a descent.

As illustrated, the upper deck 14 may be formed of any suitable material, such as expanded metal, deck planking, concrete, or the like. Various embodiments of systems 10 in accordance with the invention are identified in the U.S. Patents and Applications incorporated hereinabove by reference. Various embodiments for decks 14 or platforms 14 serving as upper stations 12 are illustrated and detailed.

In the illustrated embodiment, a railing 13 is important because the system 10 is unattended. Instead, users (riders) are trained, their decisions are limited, and their equipment is modified in order to assure user safety. Accordingly, users are restricted by various mechanical and electronic interlocks from improperly entering or exiting a station 12 or launching from the station 12. A station 12, absent the proper authorization, safety checks, and so forth, will not permit a user to enter therein and launch therefrom.

As a user approaches the upper station 12 a reader 15 is provided as part of an electronic portal 16. This entry portal 16 will require identification, authorization, and so forth as described hereinbelow.

The upper station 12 may include an access control 17, such as a turnstyle 17, or the like. Various embodiments of a system 10 in accordance with the invention may count, track, control, and report on the specific locations of various users operating within the system 10.

Thus, in some embodiments, the turnstyle 17 may be required. Alternatively, another barrier 18 or gate 18 may be the access control. In certain embodiments, the portal 16 will be required for entry through a physical barrier 18 after which a turn-style 17 or other access control 17 may count, track, register in, and so forth a user.

The actuator 19 or bar 19 of the turn-style 17, if conventional, may not serve as an absolute physical barrier 18. Thus, either, or both, in series, may be relied upon in the system 10. However, the actuator 19 may be defeated in an unattended system. For example, subway systems, mass transit rail systems, and so forth often use turnstyles 17 as an entry and exit mechanism, including control by card readers, and so forth. However, such systems are all attended. Various transit authority police, station attendants, and the like as well as a large public population will notice and report any breaches or other violations.

In contrast, in an apparatus and method in accordance with the invention, the system 10 may be remote, and completely unattended for extended periods of time, including hours, possibly days, but probably inspected at least weekly. In most circumstances, one would expect to have a safety check by personnel perhaps daily, traveling through the system 10 on all the routes. However, this takes an extensive period of time, and need not be done everyday. However, prudence would suggest at least weekly inspections.

Since the system 10 is unattended for extensive periods of time, and since zip lines over ravines, rivers, forests, and other scenic sites are inherently life-or-death situations, safety requires protection that cannot be defeated. Thus, the fence 13 may actually be higher than an individual can access or climb, and may be protected by security devices, concertina wire, or the like against incursion by unauthorized individuals.

For example, remote systems 10 will not likely be defeated by paying customers as riders, properly equipped, trained, and authorized to access the system 10. However, it is not unknown to have complete strangers access a zip line with makeshift equipment, and cause harm to the system 10, as well as personal danger, injury, or worse. Therefore, the presence of an absolute physical barrier 18 as well as the access control 17 is not actually a redundancy. Thus, by urging the actuator 19 forward, a user (rider) may rotate a turnstyle 17, thus gaining proper access, recording an account or access number associated with the rider, the trolley, or both, and so forth.

A track line 20 is connected between towers, and suspends therefrom as a catenary. The patent documents incorporated hereinabove by reference lay out detailed structures and methods for establishing anchors, towers, bollards, and the like for a track line 20. The track line 20 is typically formed of a wire rope of suitable dimensions, typically from about three quarters inch to about one inch in diameter. Nevertheless, shorter spans support less weight, and therefore may rely on smaller diameters. Likewise, longer spans may be correspondingly larger.

The track line 20 originates near the upper station 12 such that the track line 20 passes directly over the upper deck 14, at a height providing safe access to a user (rider). Ultimately, the track line 20 also descends (always with a downhill slope) to a lower station 22. The lower station 22 is similar in construction to the upper station 12, to include a fence 23 or railing 23, a lower deck 24, and one or more readers 25, associated with an electronic portal 26. Again, the lower station 22 may include an access control 27, such as a turnstyle 27, and a physical barrier 28 or gate 28. An actuator 29 or bar 29 on a turnstyle 27 is simply one mechanism by which to detect that a user has exited. Others may operate including reader 25 and reminder 29 affirmatively engaging a user.

An important reason for an actuator 29 on a turnstyle 27 is to obtain a report without requiring or relying exclusively on memory or training of a rider. Certain protections and interlocks within the system 10 will prevent accidentally loading a single line 20 with multiple users. Similarly, a rider will not be permitted to leave the upper station 12 until the lower station 22 is clear. Thus, it is just as important for a rider to check in with a reader 25 at a lower electronic portal 26 to check in through activation of a reader 15 in an upper portal 16. The turnstyles 17, 27 also indicate rider locations. Passing through a turnstyle 17, 27 indicates that an individual has entered or exited the respective deck 14, 24. Certain provisions may be made for various portals 16, 26 at different locations in order to more specifically identify where exactly users are located. For example, if multiple riders are allowed on a deck 14, 24, they may be required to remain at registered locations away from the path of a trolley and rider actively moving along the track line 20.

For example, the system 10 has been integrated and simplified for users sufficiently that children may be able to operate as riders of the system 10. However, physical height is a limitation that cannot be readily overcome. Thus, a man nearly six feet tall or a woman of corresponding stature may be able to reach a track line 20 from a deck 14, 24. However, a child a foot or less shorter in height cannot. To that end, stairs, steps, risers, or the like may be added to the deck 14, 24 in order to permit a smaller use to clip in to the track line 20.

Alternatively, an associated adult may be permitted access to assist. A parent or adult chaperone may be permitted on the deck 14, 24, so long as verification is provided that such an attending, related, responsible adult is sufficiently clear of the path under the track line 20 when riders are coming and going.

Thus, the electronic portals 16, 26 may permit multiple persons to be on the decks 14, 24 at any given time, but may require that all adults other than the designated rider be remote from the track line 20 any time a rider is underway thereon. Thus, when the trolley is stopped at the upper deck 14 or the lower deck 24, then a responsible, chaperoning adult may approach to assist in clipping in and unclipping a child rider.

Various additional equipment is installed about the stations 12, 22. For example, a cable gate 30 or cable close gate 30 serves as an electronically actuated, mechanical interlock 30. The cable close gate 30 is a mechanical system that preferably blocks any ability of a user 45 to travel down the track line 20. The gate 30 effectively arrests anything traveling along the track line 20 against leaving the upper station 12. A gate 30 may operate in any of several manners.

For example, a yoke that simply sits on the line 20 will serve this function. Likewise, a hook, a plate-shaped shield may serve. A plate, cone, ball, or other obstruction, having an aperture or slot in the bottom thereof, may be activated to slide down over the line 20. With the line 20 occupying the slot, the obstruction provides a stop against any access to the track line 20 or at least any movement downward therealong.

In other embodiments, a physical obstruction 30 of any type in close proximity to the track line 20 incapable of preventing passage there along will serve. The shape is less important than the proximity to the track line 20, in order that no sliding or rolling member can pass. For example, a rectangular plate with a slot or aperture protruding from a bottom edge to about the center thereof may block the line 20. Similarly, a spherical obstruction having a slot between a lower edge and a center thereof may be placed over the line 20.

In another embodiment, a hook or latch may engage the top, bottom, or other location on any material or fixture attempting to travel along the line 20. In another embodiment, a simple bar or rod may pass horizontally under the line 20 at a distance and of a length calculated to prevent any suspended item from passing along under the line 20. Any combination of rods, plates, spheres, solids, hooks, wedges, or the like pivoting or translating into position increases cross sectional area. Any such mechanisms may be used to assure that no unauthorized structures may pass along the line 20 out from the upper station 12.

The significance of the cable close gate 30 is primarily safety. Unauthorized access to the line 20 at any time, by any person, for any reason may risk damage to the line 20 or other parts of the system 10. However, the highest risk of loss, damage, or injury is to any person who accesses the line 20 without authorization. Serious injury or death may occur as a direct consequence of unauthorized access. Accordingly, a system 10 that does not require a plethora of attendant technicians managing and instructing riders at the upper station 12, lower station 22, or both militates in favor of serious efforts at locking out unauthorized persons for their own safety.

Referring to FIGS. 1 through 5, and to FIGS. 1 through 16, generally, also at the upper station 12 is a launch block 32, certain embodiments of which are disclosed herein. Others are disclosed in the references incorporated herein by reference. The launch block 32 is responsible for registering, meaning mechanical registration, electronic registration, or both, of the trolley 50 of any rider 45.

The launch block 32 is provided with certain fixtures and fittings that meet in a mating relationship with components used by the rider 45. Accordingly, mechanical registration assures that the mechanical interlocks are closed, are properly located, and that a user 45 may properly operate the system 10. Likewise, certain sensors in the launch block 32 provide electronic interlocks that report (to a master controller 40 (computer) the proper registration in space, and therefore the proper registration with suitable control systems in order that launch from the upper station 12 is authorized and enabled.

Meanwhile, a terminal detector 34 may optionally detect passage of a user 45. Nevertheless, in most embodiments, the incoming portal 16 and its reader 15, the outgoing portal 26 and its reader 25, and various optional sensors and controls on the barriers 18, 28, turnstyles 17, 27, and the like may report access by users, entry, and exit, and control them to promote safety.

Figure 2:
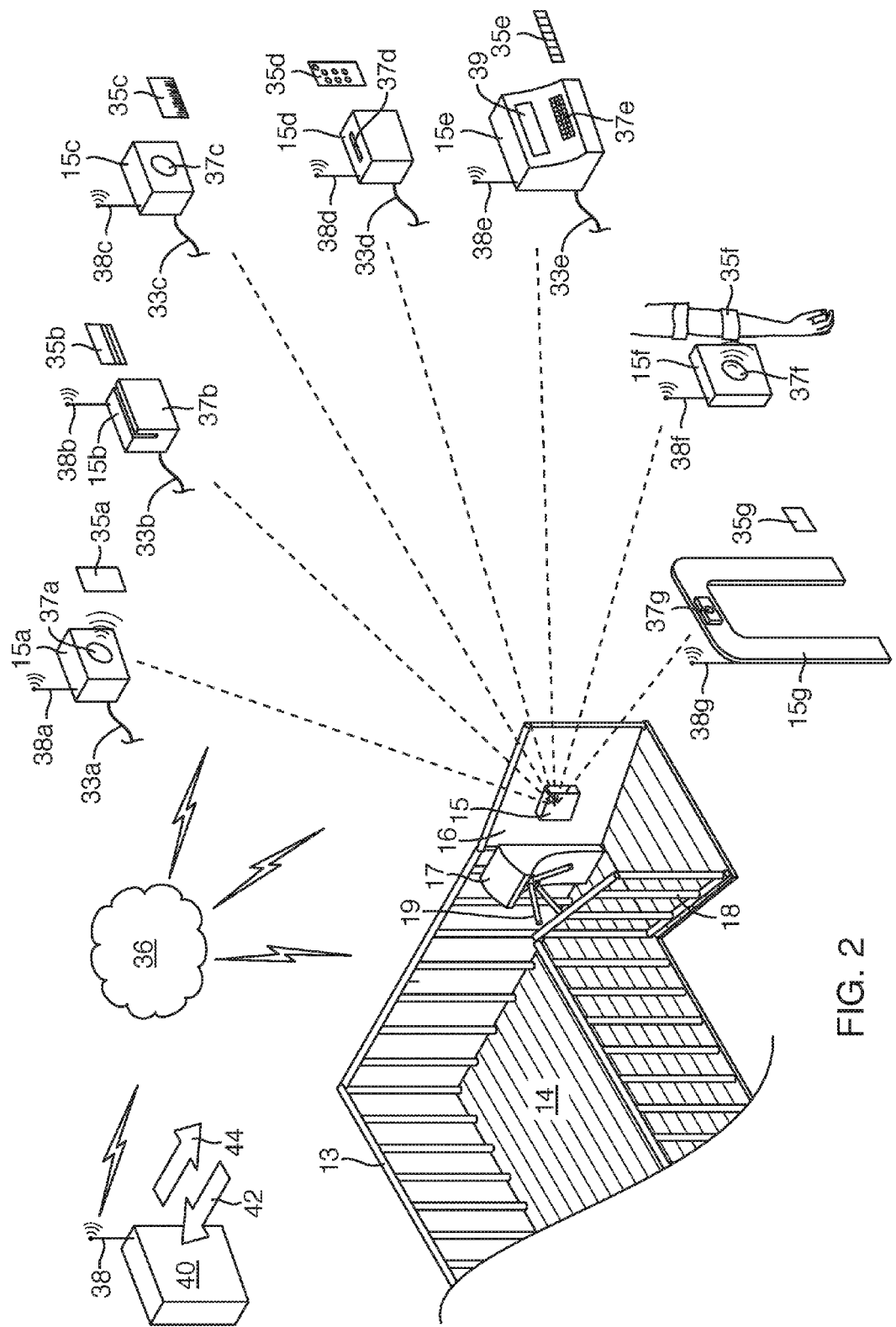
FIG. 2 is a perspective, exploded view thereof, showing various optional readers and corresponding targets suitable for use in the upper and lower stations.

Referring to FIG. 2, a power source 33 or power line 33 may be provided for various readers 15. Readers 15 may take on various embodiments. For example, a reader 15a may operate as a radio frequency detector, such as RFID reader systems 15a. In such a system, a target 35a may be read by way of a sensor 37a communicating over a network 36 connected by a communication link 38. Thus, the communication link 38a connects the reader 15a to the network 36. The signal from the sensor 37a may be processed by the reader 15a, or may be simply transmitted or read.

Ultimately, a master controller 40 includes a computer system 110 (see FIG. 10), one classical embodiment thereof being described hereinbelow in greater detail. The computer system 110 is tasked with receiving incoming data 42 from monitoring the portals 16, 26 and the readers 15, 25. Similarly, additional sensors may be provided, as well as local controllers, actuators, and detectors (like those described herein) for the access controls 17, 27 and the physical barriers 18, 28.

By the various modes of operation, signals from all sensors in the foregoing and other components may be transferred. They arrive as monitoring data 42 or incoming data 42 received by the master controller 40.

After processing the incoming data 42, the master controller 40 provides commands 44 or authorization 44 back to various devices in the system 10. For example, actuators and locks may be opened or enabled for the access controls 17, 27, the physical barriers 18, 28, as well as the cable close gate 30, the launch block 32, and so forth. Detectors 34 typically need not have any controls associated therewith. That is, there is no need for a command to be received by in every embodiment of the detector 34. Such straightforward functionality as turning on, turning off, polling, reporting, and the like may be programmed to involve commands sent to detectors 34, such as the terminal detector 34. Nevertheless, in other embodiments, the detector 34 may simply report a signal when polled. It may report activity on an interrupt basis as in various modern digital computer systems.

Figure 3:
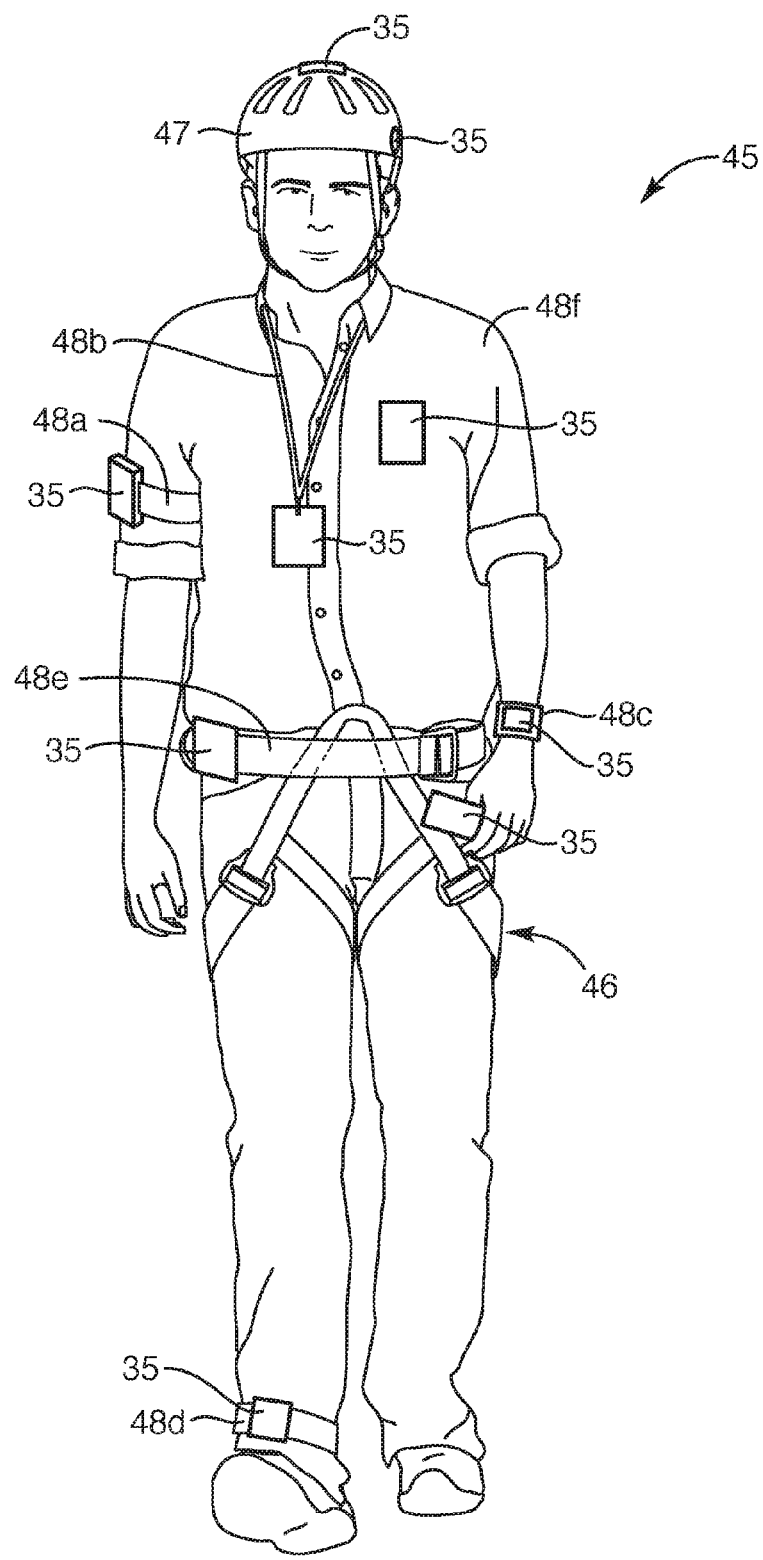
FIG. 3 is a perspective view of a rider in harness, and illustrating various types of targets that may be associated singly or together with a rider using a system in accordance with the invention.

Referring to FIGS. 2 and 3, the readers 15, 25 may be implemented in any of the embodiments illustrated in FIG. 2, or others. For example, the reader 15*b* relies on a card 35*b* such as a magnetic card in order for a sensor 37*b* to detect data from the magnetic card 35*b*. Suitable power sources 33, such as a line 33*a*, 33*b*, or a battery, or the like may serve to power the reader 15 and the communication link 38.

One should note that it is proper herein to speak of any reference numeral alone, with any trailing alphabetical character, or both. That is, a reference number refers to a named item. A trailing reference letter refers to a specific instance of the item designated by the reference numeral.

The readers 15*a*, 15*b*, 15*c*, 15*d*, 15*e*, 15*f*, 15*g* each rely on their own respective targets 35*a*, 35*b*, 35*c*, 35*d*, 35*e*, 35*f*, 35*g*, and sensors 37*a*, 37*b*, 37*c*, 37*d*, 37*e*, 37*f*, 37*g*. Any of the sensors 37 may simply send digital data directly back over the communication link 38*a*, 38*b*, 38*c*, 38*d*, 38*e*, 38*f*, 38*g*, respectively. Alternatively, within any individual reader 15 may be initial processing to track, record, report, manipulate, calculate, or otherwise make use of the signal initiated by detection of any target 35 by its corresponding sensor 37.

For example, an RFID tag 35*a* may contain substantial information. Likewise, a magnetic card 35*b* may contain comparatively large quantities of information. In fact, modern magnetic card systems provide for chips containing much more data than could be carried on the conventional magnetic strip.

Similarly, a bar code ticket 35*c* may contain some amount of information, and may be embodied in any format. For example, the ticket 35*c* may include a literal bar code, a QR code, or some other visual or image printed on the ticket 35*c*. Thus, the sensor 37*c* may read information in considerable detail. Alternatively, the master controller 40 may have substantial information linked to an identifier, requiring only a characteristic identification number to be carried on any one of the targets 35.

Thus, for example, when the mechanical card 35*d* is passed into a sensor 37*d*, of a reader 15*d*, limited digital data may be available. A typical mechanical card 35*d* includes apertures that are read by passing light, contacts, rods, or the like through the card 35*d* at selected locations. That set of locations ends up defining a state or a set of gates that are open or closed depending on whether or not they will pass a light or mechanical rod, electronic, or electrical contact signal therethrough.

With a mechanical card 35*d* data may be somewhat limited, relying on the master controller 40 to receive a code number embedded in the ticket 35*d* (target 35*d*), which will then permit the reader 15*d*, the master controller 40, or both to know or have access to all of the other data related to the bearer of the mechanical card 35*d*.

Likewise, a key pad 37*e* may operate as a sensor 37*e*, reading a series 35*e*, of numbers or digits that operate as the key 35*e*, or target 35*e*. A user 45 may input into the key pad 37*e* the data 35*e*, thus providing identification of a rider. Again, the reader 15*e*, the master controller 40, or both may then be able to access all necessary data corresponding to the user 45 who input the digits 35*e*, into the reader 15*e*.

One advantage of using a comparatively smaller data set in any given reader 15 is that minimal processing is required. The advantage of including more data means that processing can be done right at the reader 15. This may occur so long as the proper authorizations have been communicated over the communication link 38 from the master controller 40.

In other embodiments, a reader 15*f* may read any target 35*f* that is detectable from a distance. For example, a user 45 may wear an article of clothing, or some other characteristic holder positioned at a specific location on the body or equipment of a user 45. The sensor 37*f* may thereby automatically read a signal available to the sensor 37*f* in response to detecting the target 35*f*.

In yet another embodiment, a magnetic loop 15*g* may operate as a detector 15*g*. Typically, a magnetic detector 15*g* will operate to activate a target 35*g* by induced electricity or magnetism. Thus, the target 35*g* may be inactive until operated upon by an electrical or magnetic field imposed by the magnetic loop detector 15*g*. Accordingly, a sensor 37*g* may receive a signal originated by an activated target 35*g*. Accordingly, most of the actual logic of processing may be done by the master controller 40, or electronics associated with the detector 15*g* or its sensor system 37*g*.

Referring to FIG. 3, a rider 45 may be provided with a harness 46, helmet 47, and some securement 48, to any of which may be secured one or more targets 35 or passes 35. For example, in the illustrated embodiment, beginning clockwise from the top of the illustration, a target 35 may be replaced on the top of a helmet 47 to be read by a detector 37 or sensor 37 above the user 45, and having a field of view therebelow.

As another example, laser bar code readers 15 use a coherent beam of light, and may therefore read codes at a considerable distance on a target 35 or pass 35. Thus, such readers 15 above a user 45 passing through a portal 16, 26 may automatically detect and report a location and time of a user 45 identified by the target 35 or pass 35.

The target 35 on the side of a helmet 47 may operate in much the same manner. Also, in systems such as radio frequency identification systems 15*a*, passing by a portal 16, 26 may cause the proximity of the target 35 to be detected, read, and reported. Likewise, if a shirt 48*f* operates as a securement 48, then a pass 35 or target 35 may be in a pocket, or secured to the shirt 48*f*. A wristband 48*c* may contain a target 35 easily presentable to a reader 15 at a fixed location at about waist height or above. For example, a user 45 may orient the wristband 48*c* and target 35 associated therewith near the sensor 37 of any reader 15 in order to provide identification, location, and time to the master controller 40.

The ankle band 48d illustrated may be well adapted to radio frequency detectors 37a, and certain bar code readers 15c. For example, if a reader 15 is positioned in a comparatively low position close to a deck 14, 24, then passage of a user 45 thereby will result in detection of the target 35 on the band 48d. Moreover, if feet must pass through a gate, they present ready orientation and comparatively restrictive distance with respect to a deck 14, 24 and reader 37.

Similarly, a belt 48e of a harness 46 may have attached thereto a target 35. Somewhat more cooperation from a user 45 may be required in order to assure that no arm, equipment, or other obstruction is between the target 35 and any individual sensor (reader) 37 needing to "view" that target 35. Nevertheless, such a location is unlikely to be damaged, obscured, or accidentally unavailable. Here again, convenience of the user 45 is one consideration. Nevertheless, a user 45 will be motivated to properly present a target 35 to a reader 15, inasmuch as the system 10 will not function until the reader 15 has received confirmation that a target 35 has arrived, indicating that the corresponding user 45 is in the correct place.

Similarly, a lanyard 48b may connect to a target 35 worn around the neck. One advantage of a lanyard 48b is that a user 45 may grip the target 35 on the lanyard 48b and present that target 35 to a particular sensor, of virtually any type. For another example, a reader 15e, that provides a key pad 37e as the detector 37, may be served well by the presence of all key information being on the target 35 or pass 35 attached to the lanyard 48b. Similarly, various readers 15 may be presented (by the user 45) with the target 35 on the lanyard 48b from a variety of angles. Again, the size of the lanyard 48b may be selected to accommodate such access by readers 15.

As a practical matter, it has been official, indeed almost essential, that a user 45 receive feedback from a reader 15. For example, a user 45 or rider 45 needs to know from the reader 15 that a target 35 has been read, and has been accepted. Thus, for example, a sound, light, voice, image, text, or the like may be presented to a user 45 on a monitor screen 39 available on any reader 15. Thus, LED (light-emitting diode) lights, sounds, bells, alarms, voices, and the like may be provided as a monitor 39 on any reader 15 providing feedback to a user 45.

Just as a wristband 48c or ankle band 48d may provide a ready location and position for holding a target 35, so an arm band 48a may provide a proper securement 48 for a target 35. Of course, a user 45 may simply carry a target 35 or a pass 35 in the hand as well. Again, this may be interpreted as one variation of the lanyard 48b solution. If a user 45 is going to hold a target 35 or a pass 35 in a hand, then perhaps that hand should be permitted to simply release the target 35, and have a lanyard 48b or other tethering mechanism retrieve and secure that pass 35 for the next use.

In some respects, a pass 35 that is held in the hand provides for precision required by electronic equipment in various types of readers 15. Thus, any proximity sensor 37f, or any detailed data reader, such as magnetic card readers 37b, bar code readers 37c, or the like need not rely on automatic detection of a user 45, but an affirmative presentation by a user 45 of a pass 35 or target 35 for reading.

Figure 4:
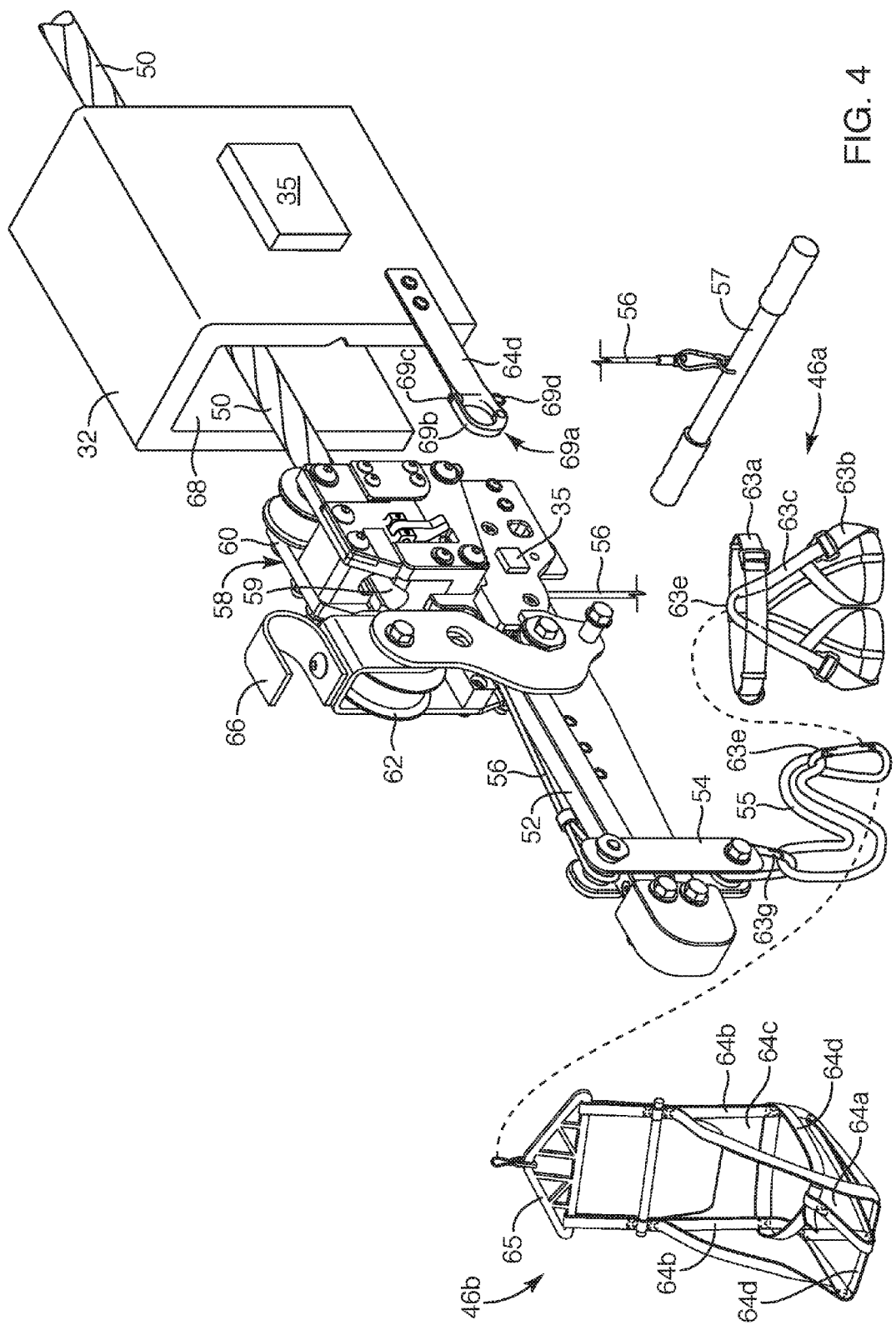
FIG. 4 is a perspective view of a trolley in accordance with the invention, illustrating a launch block, not yet registering the trolley in its secured position, and the trolley being connected in an exploded view to alternative embodiments of harnesses.
Figure 5:
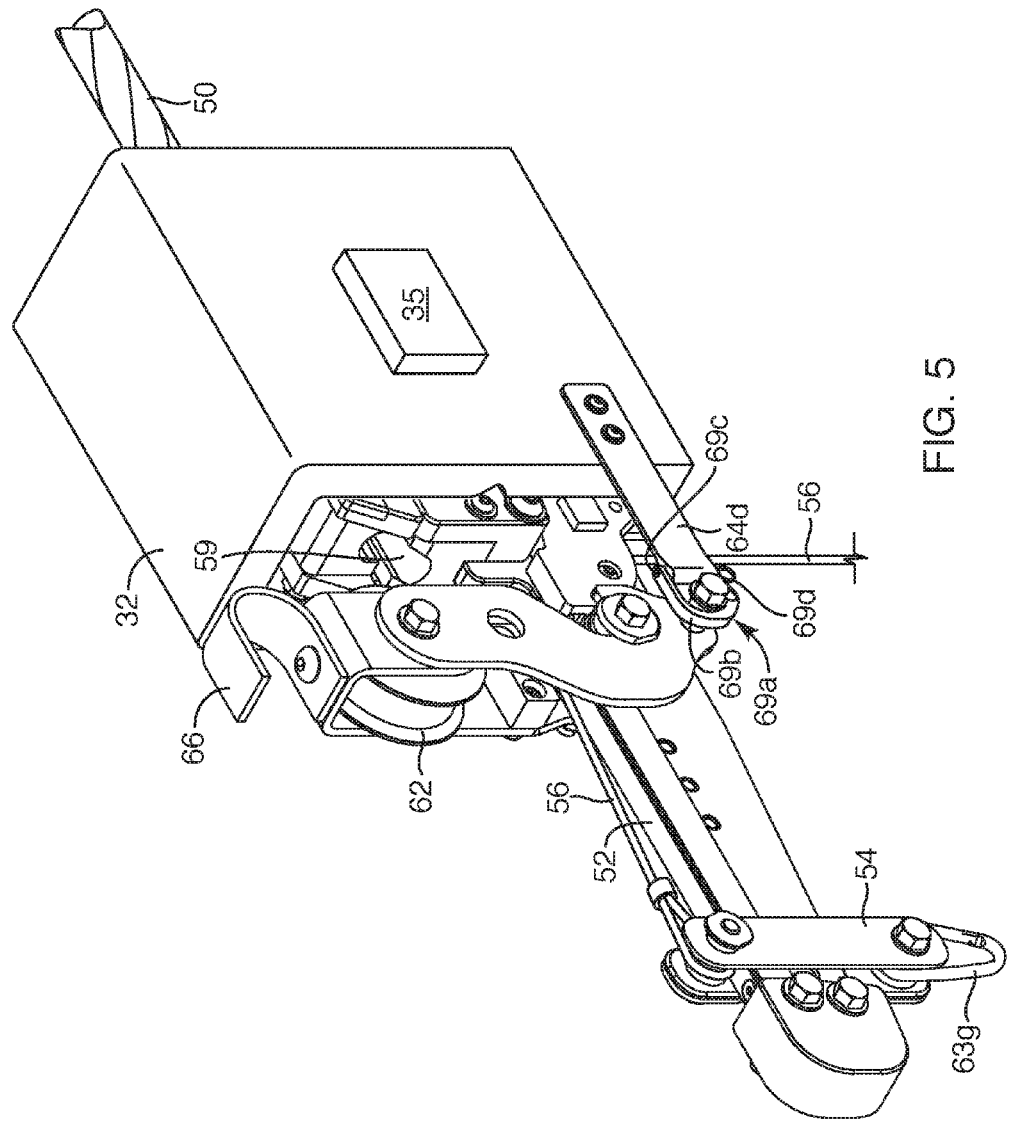
FIG. 5 is a perspective view of a trolley of FIG. 4, in accordance with the invention, illustrating a launch block now registered with the trolley in its secured position.
Figure 6:
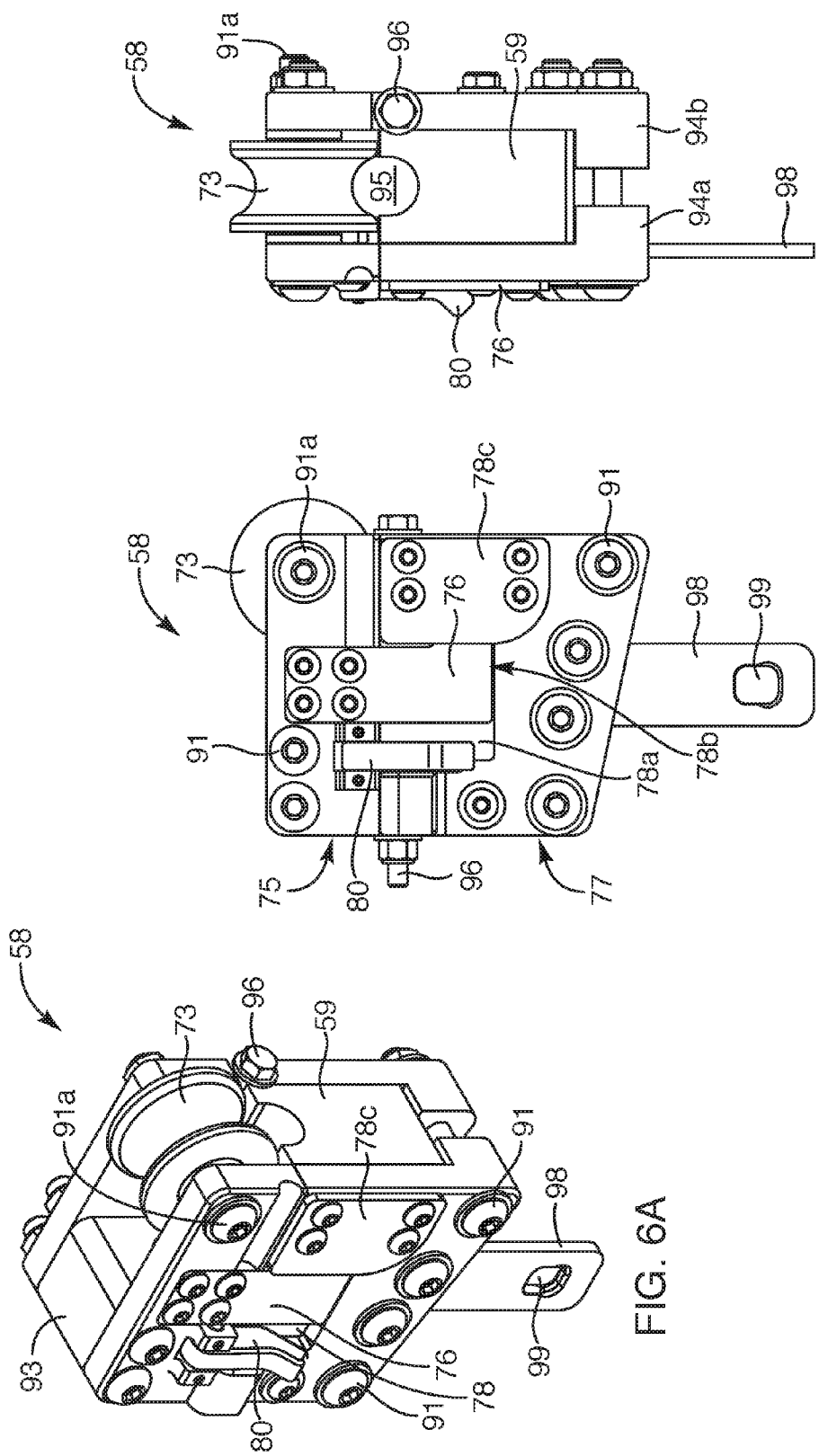
FIG. 6A is a left side, perspective view of a trolley having a launch block interlock system in one alternative embodiment thereof.
FIG. 6B is a left side elevation view thereof.
FIG. 6C is a rear elevation view thereof.
Figure 7:
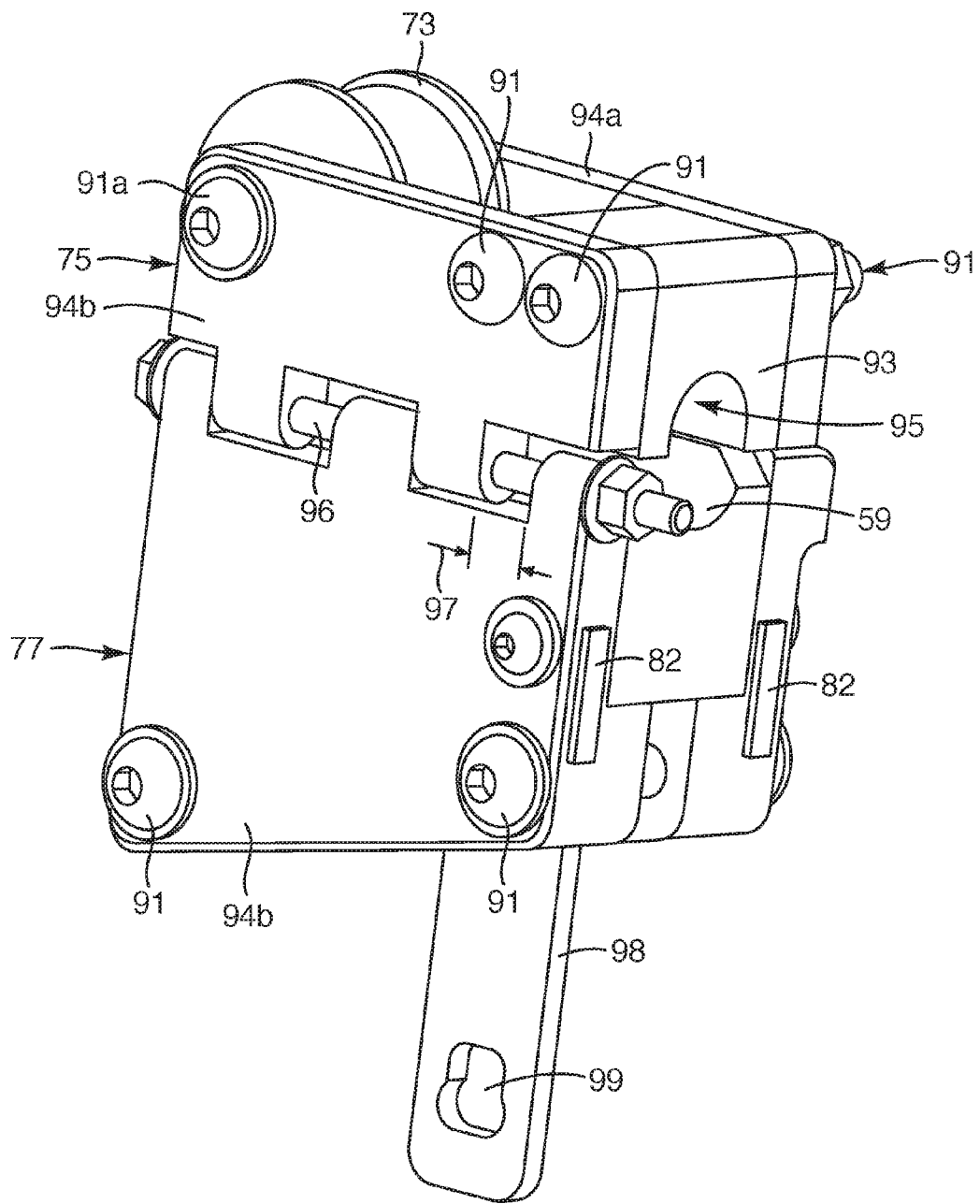
FIG. 7 is right side perspective view thereof.
Figure 8A:
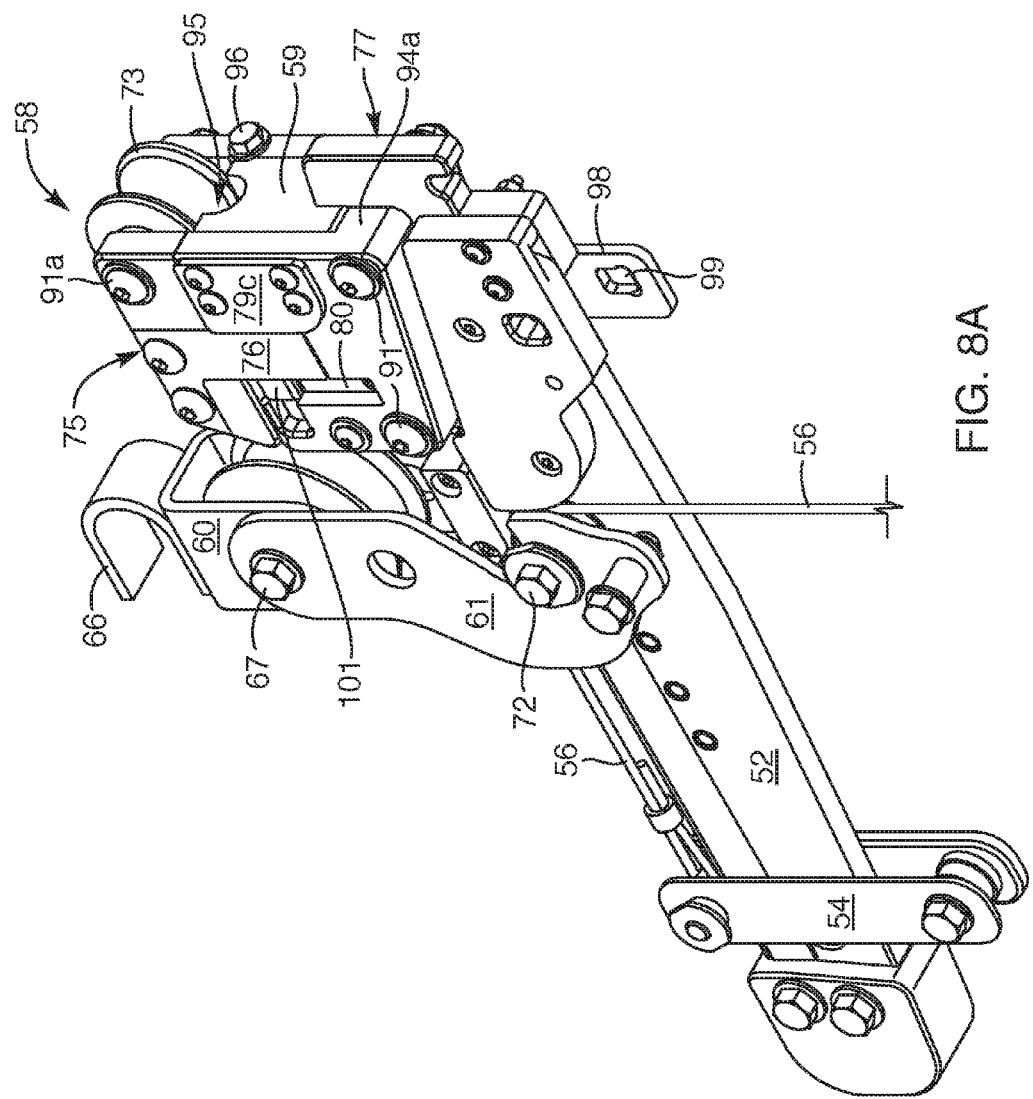
FIG. 8A is a lower quarter, left side, perspective view of an alternative embodiment of an interlocking trolley with the brake system closed.
Figure 8B:
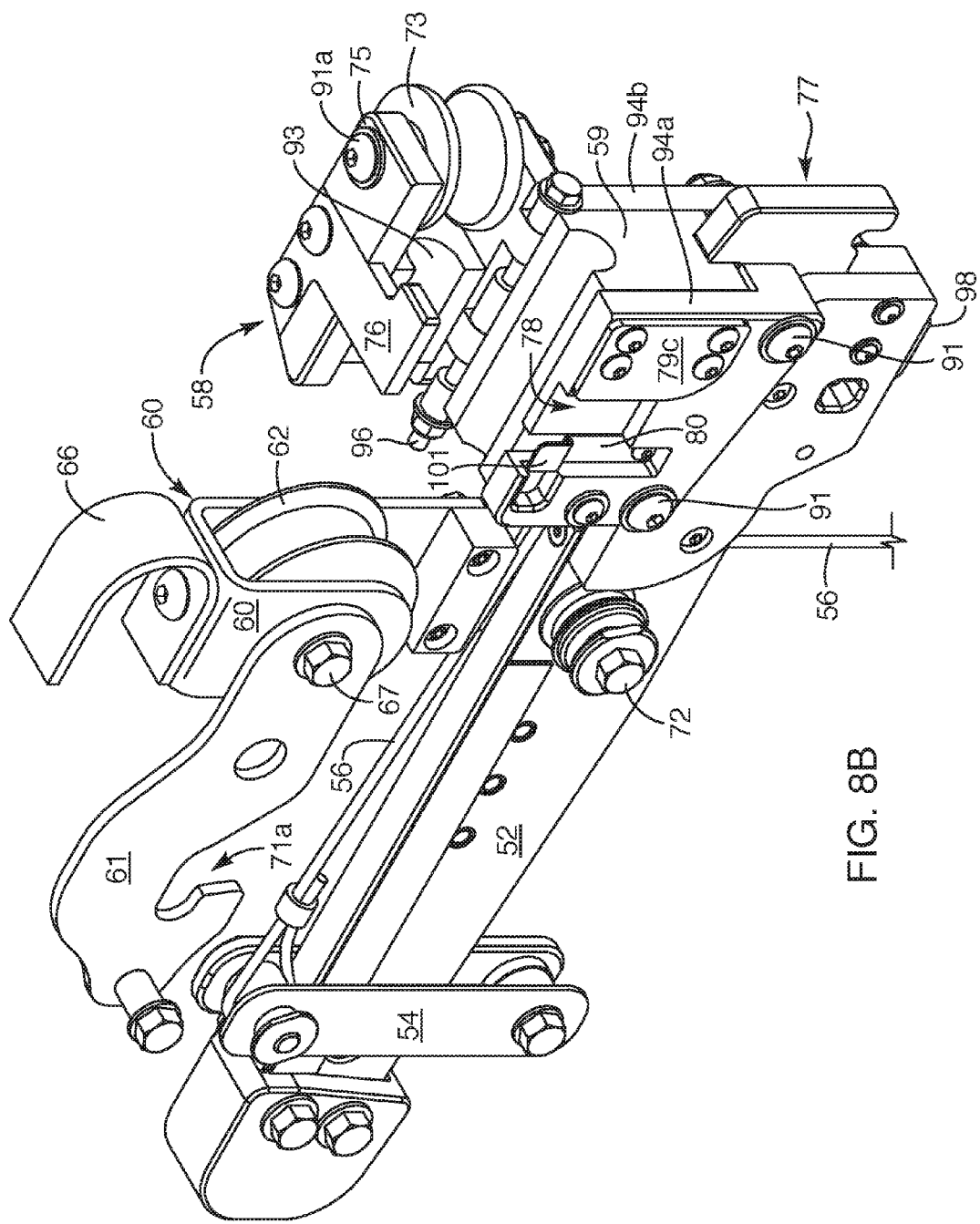
FIG. 8B is an upper quarter, left side, perspective view thereof with the brake system (caboose) open.
Figure 8C:
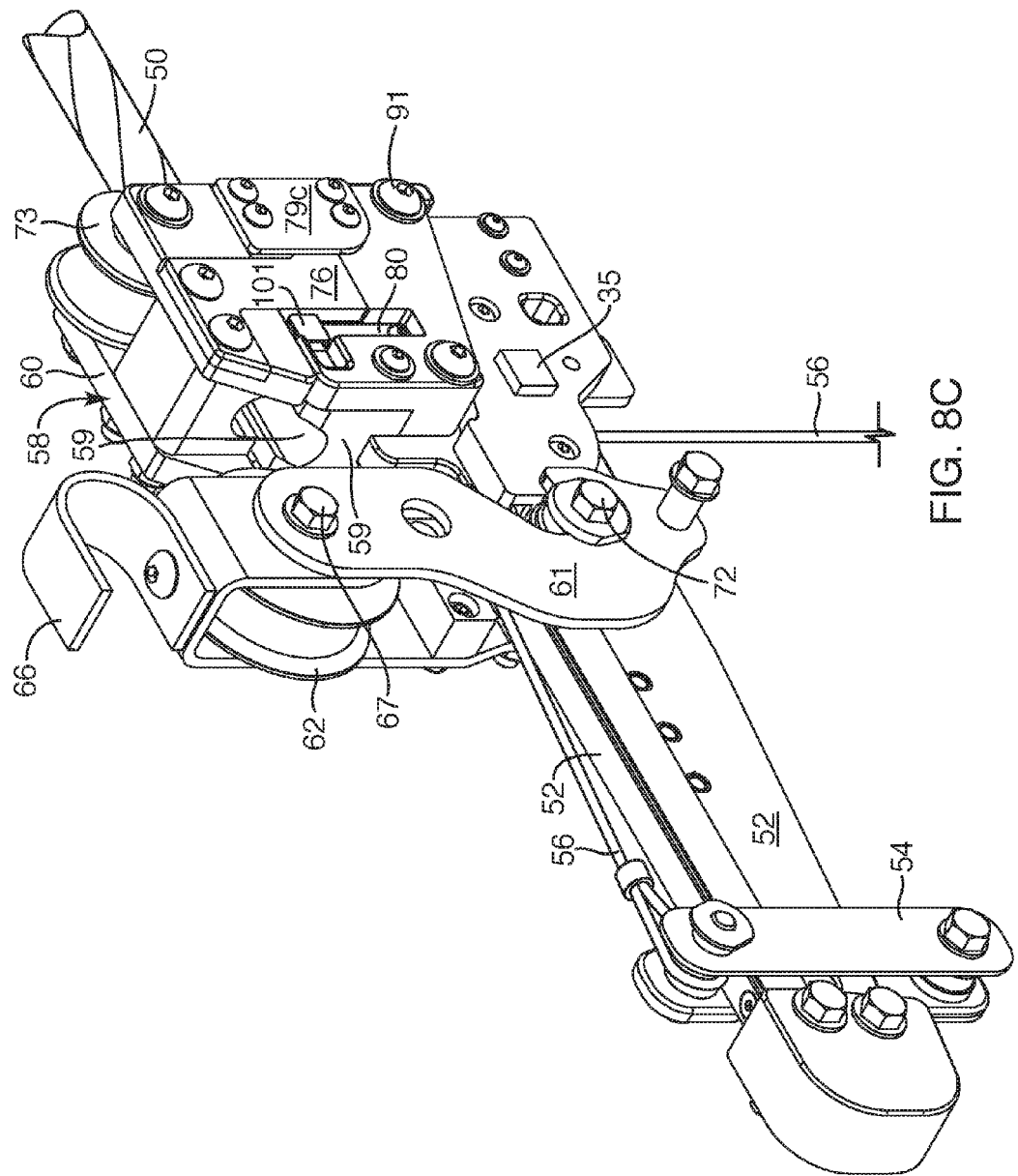
FIG. 8C is a rear, upper quarter, left side perspective view thereof.
Figure 8D:
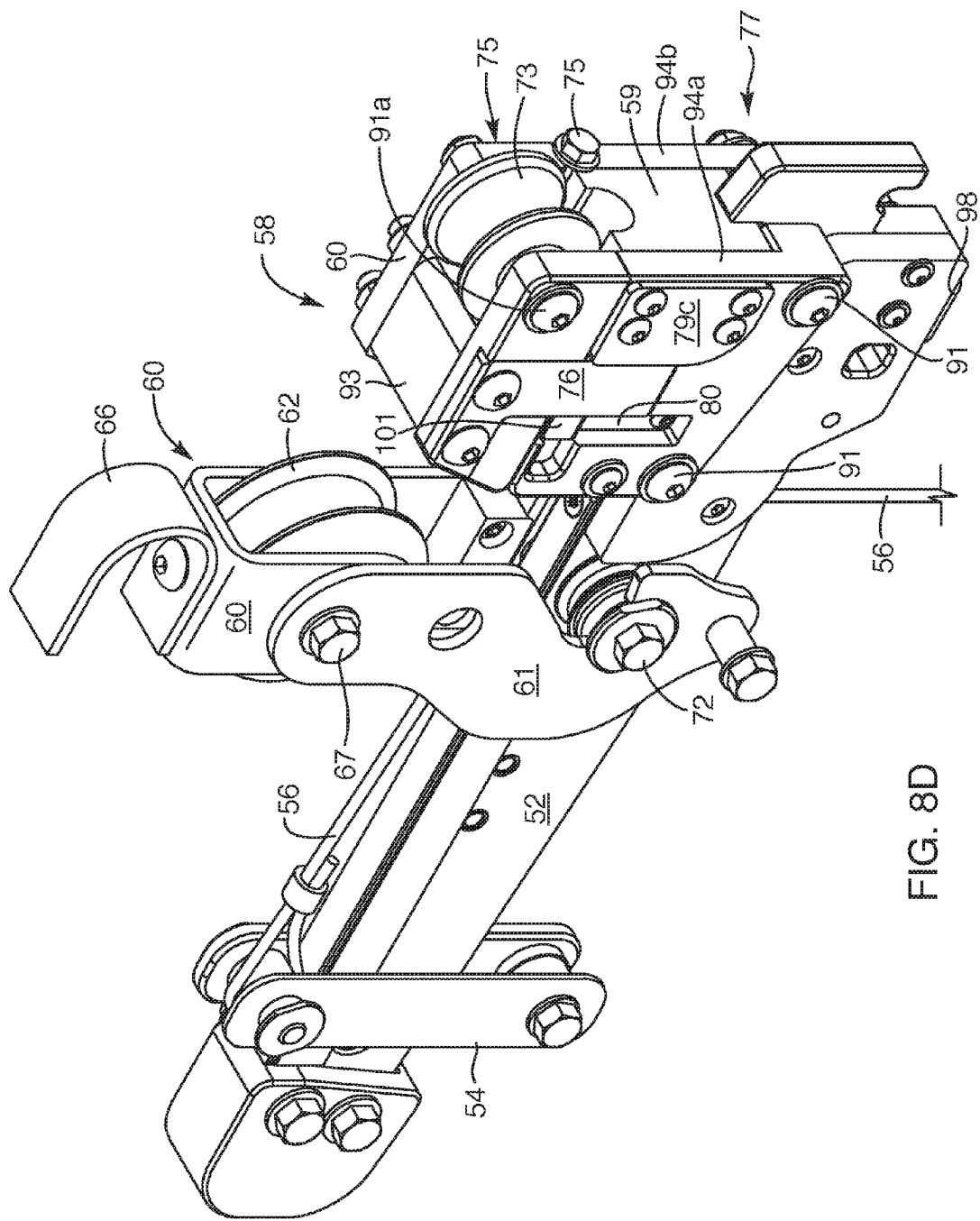
FIG. 8D is an upper quarter, rear perspective view thereof.
Figure 8F:
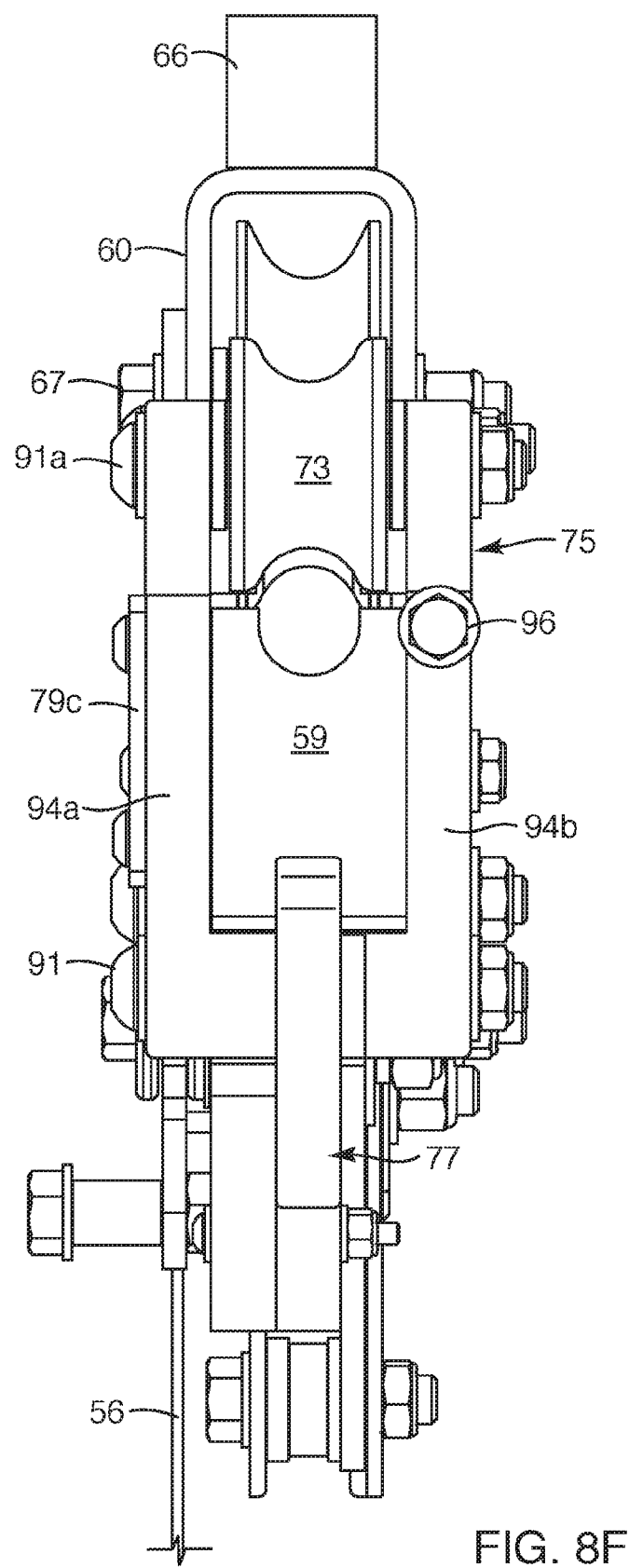
FIG. 8F is a rear elevation view thereof.

Referring to FIGS. 4 and 5, while continuing to refer generally to FIGS. 1 through 16, a trolley 50 may be configured in any one of the manners illustrated in the references identified hereinabove as incorporated herein by reference. Various trolleys 50 are illustrated therein, and described in great detail. In a system 10 in accordance with the invention, an arm 52 or lever 52 may operate as the frame 52 of the trolley 50.

To the lever 52 or arm 52 may be secured a hanger 54 movable therealong. The hanger 54 will typically operate as a slide 54 (on rollers or not) that can move along the arm 52. In one presently preferred embodiment, the hanger 54 is free to move along the arm 52, in accordance with control by a user 45. That is, a user 45, suspended in a harness 46 from a sling 55 or other attachment mechanism 55 may be able to pull on a tether 56 attached to a handle 57. For example, the tether 56 draws the hanger 54 along the arm 52, away from the extreme end thereof. In this way, the position of the effective weight of a user 45 transferred through the sling 55 to the hanger 54 changes the braking of the trolley 50.

In selected embodiments, the hanger 54 may be pinned at a specific location along the arm 52. For example, if a child is the rider, or if a user 45 does not desire to exercise braking control on the trolley 50, then the arm 52 may be fixed at a particular effective leverage, by positioning the hanger 54 at a specific location along the arm 52. This results in a constant braking force due to a fixed lever arm or lever advantage. Leverage exists between the hanger 52 on one end and the brake 58 on the other end. These pivot with about the bracket 60 or frame 60 about the axle 72 or pin 72 under the roller 62 or wheel 62 that rolls along the track line 20.

For example, in various embodiments illustrated in the references incorporated herein by reference, single- or multi-wheel 62 embodiments are described. Accordingly, a selected number of rollers 62 mounted in a frame 60 permit the trolley 50 to roll along the track line 20. The leverage of the arm 52, and specifically the weight of a user 45 suspended from the hanger 54 by a sling 55 or other securement 55 provides leverage about the fulcrum that is the roller 62 in the frame 60.

The brake system 58 provides frictional braking against the track line 20 by the brake 58 according to the force applied the hanger 54 by a user 45. Thus, one may see that as described in the references incorporated herein by reference, the hanger 54, if mobile along the arm 52, may be drawn by the tether 56 to move the effective lever arm (change the leverage advantage) of a user 45 or the weight of a user 45. This multiplied force is effectively applied as the normal force in applying friction by the brake 58, where friction drag force is a constant multiplied by the normal force.

Various types of harness 46 may be suitable. For example, the harness 46a is a climbing harness typically used in rock climbing, rappelling, and in some inspection, and other servicing of items at heights that may be dangerous to a user 45. For example, whether working on a roof, a tower, a track line 20, a ski lift, or the like, a climbing harness 46a may be donned by a user 45.

The climbing harness 46a has a belt 63a as well as leg loops 63b. The leg loops 63b are connected by a lateral tie 63c extending therebetween and sewn together carefully by certified methods in order to assure an ability to provide life saving strength in the event of a fall. Meanwhile, a vertical tie 63d connects the lateral tie to the belt 63a. Typically, a link 63e such as a carabiner 63e will connect a sling 63f (such as sling 55) between the link 63e and a link 63g connecting to the hanger 54.

In an alternative embodiment, a harness 46b may be configured more like a chair having a seat 64a suspended from vertical risers 64b. Likewise, the seat 64a may continue to a seat back 64c. Meanwhile, various reinforcement straps 64*d* may provide substantial additional support for the harness 46*b*. In this way, for example, the seat 64*a* and seat back 64*c* provide comfort, but the maximum safety support in case of emergency is provided by the main straps 64*d* of the harness 46*b*.

A spreader bar 65 may provide for comfort, ease of mounting and dismounting the harness 46*b*, and the like. Again, spreader bars 65 have been discussed in great detail in the patent documents incorporated herein by reference. Significantly, the spreader bar 65 may replace all or part of the length of a sling 55. Alternatively, a spreader bar 65 may be suspended from a sling 55.

At an upper end of a track line 20, above the deck 14 of the upper station 12, the launch block 32 provides registration of the trolley 50. In the illustrated embodiment, the trolley 50 includes the main roller 62 supporting it and a caboose 58 providing braking.

Referring to FIG. 5, a trolley 50 may fit part of its caboose 58 within a launch block 32. By fitting the entire width 102 of the caboose 58 or brake system 58 within the launch block 32 various registration interlock functions are enabled. A width 102 or thickness 102 of the caboose 58 needs to fit in the launch block 32. The height of the caboose 58 needs clearance for motion up and down.

The brake system 58 or caboose 58 has a thickness 102 that fits within a receiver 81 formed in the launch block 32 in order to register spatially and engage for interlocking.

To remove and install the trolley 50 on a track line 20, the swing arm 61 or gate 61 must be cleared of the pin 72 that operates as the pivot 72 about which the lever arm 52 is supported and tilts. Typically, a swing arm 61 pivots about an axle 67 of itself and of the wheels 62, once the pivot pin 72 of the arm 52 has been lifted sufficiently high to release out of the slot 71*a*. By lifting the lever arm 52, the pin 72 or axle 72 is lifted within the slot 71*a*. Meanwhile, the pin 72 also lifts in the slot 71*b* in the frame 60 or housing 60 opposite the swing arm 61 of the frame 60. The slot 71*a*, having an "L" shape, will not release the pin 72, until the pin 72 rises in the slot 71*a*. Thereafter, since the slot 71*b* cannot move, longitudinally along the direction of the lever arm 52, with respect to the pin 72, the swing arm 61 must swing forward, thereby releasing out the pin 72 to exit the opening of the slot 71*a*.

Thereafter, the opening of the swing arm 61 by pivoting it in a forward direction with respect to the axle 67, provides access to the track line 20 supporting the roller 62 or pulley 62. However, the removal of the trolley 50 from the track line 20 requires removing the roller 62 from riding on the track line 20. Thus, the brake system 58 must also open.

To remove the trolley 50 therefore requires that the top cage 75 of the caboose 58 be flipped open to release the track line 20 captured therewithin.

The caboose 58 will be described in more detail hereinbelow. However, suffice it to say that the caboose 58 includes a base 77 or frame 77. The frame 77 holds an axle 96 that secures the top cage 75, pivotally linked to the frame 77. An interlock system 74 provides securement and selective release of the top cage 75 to pivot about its axle 96. Pivoted into an open position, the top cage 75 exposes the track line 20 therewithin, thus permitting removal of the trolley 50 from the track line 20.

Figure 9A:
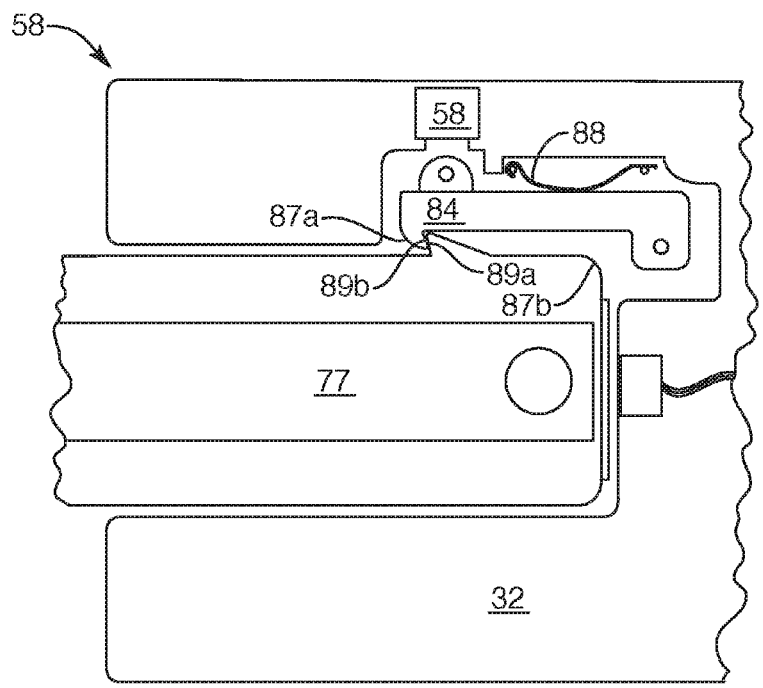
FIG. 9A is a top plan, cutaway view of one embodiment of a latch mechanism securing a trolley to a launch block.
Figure 9B:
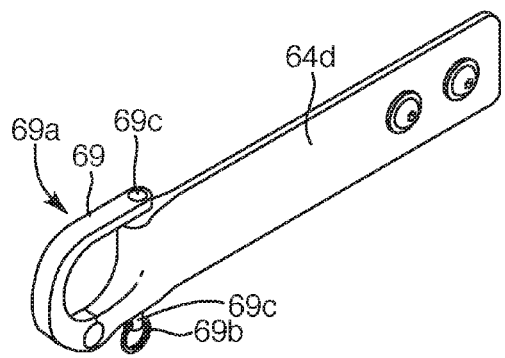
FIG. 9B is a frontal, upper quarter, left side perspective view of a snap shackle on an arm for interlocking the trolley to a launch block.

Referring to FIGS. 4, 5, and 9B, one will notice a snap shackle 69*a*. The snap shackle 69*a* may fit about the pin 72 captured within the snap shackle 69*a*. In general, a release mechanism may be configured in any number of ways. In one embodiment, a snap shackle 69*a* may include a catch 69*b* that is captured by a pin 69*c*. The snap shackle 69*a* may be mounted on a cable, or an arm 64*d*.

The arm 64*d* is secured to the launch block 32. The catch 69*b* of the snap shackle 69*a* engages the pin 72 that acts as an axle 72 for the lever arm 52. The arm 64*d* and snap shackle 69*a* act as a gauge to measure and prove a distance between the launch block 32 and the pin 72. Thus, the caboose 58 must properly fit within the launch block 32 for the pin 72 to be close enough to fit within the catch 69*b* of the snap shackle 69*a*. Other attachment schemes and latches or catches are discussed hereinbelow.

In the illustrated embodiment, withdrawing a pin 64*c* extending into the extreme end of the catch 69*b*, releases the catch 69*b* to pivot away, thus releasing the pin 72 and the trolley 50 from engagement with the launch block 32.

Referring to FIGS. 6A through 6C, 7, and 8A through 8F, while continuing to refer generally to FIGS. 1 through 16, a caboose 58, or brake system 58, may include various components. For example, the brake system 58 or caboose 58 may include a pad 59 mounted within. Typically, the caboose 58 is spaced some distance away from the frame 60 for the roller 62 or main wheel 62. Typically, the brake system 58 is fixed in effective rigid body motion with respect to the lever arm 52. In fact, the lever arm 52 may fit within side plates 94 forming a frame 94 of the caboose 58.

In the illustrated embodiment, the top cage 75 is pivotable with respect to the frame 77 formed by the side plates 94. A significant feature of the caboose 58 is an interlock system 74. For example, the top cage 75 is provided with a slide lock 76. The slide lock 76 actually represents sliding of the entire top cage 75 with respect to the frame 77. The slide lock 76 fits into a relief region 78 on the frame 77.

Typically, the relief region 78 includes a main seat region 79*a* and an interlock region 79*b*. The slide lock 76 initially pivots about the axle 96 down with the top cage 75, until the slide lock 76 fits into the main seat 79*a*. Then, the extreme end of the "L"-shaped slide lock 76 moves rearward into the interlock seat 79*b* or interlock space 79*b*. This action requires that the entire top cage 75 and slide lock 76 slide backward or rearward along the axle 96 to fit the slide lock 76 into the interlock region 79*b* of the relief region 78. This places the distal end of the slide lock 76 under a keeper 79*c* restricting the top cage 75 from pivoting out of position. Thus, the top cage 75 and slide lock 76 pivot in rigid body motion together until the slide lock 76 is in the relief region 78, seated in the main seat 79*b*. After sliding backwards, the top cage 75 and slide lock 76 secure the distal end of the slide lock 76 under the keeper 79*c* in the interlock seat 79*b*.

Once the slide lock 76 has pivoted and slid properly into a locked position, an interlock 80 or dog 80 pivots down into the relief region 78 blocking the slide lock 76 from sliding back out. The interlock 80 may be spring loaded, biased, or simply operate by gravity. However, the interlock 80 not only interlocks with the slide lock 76, to keep the slide lock 76 in place, but operates as a barrier to entry of the caboose 58 into the receiver 81 of the launch block 32.

If the interlock 80 cannot fit down into the relief region 78, in a portion of the main seat 79*a*, then the slide lock 76 is not in the proper, closed position. Once the slide lock 76 is in the proper, closed position, the interlock 80 may fit down into the relief region 78. Thus, the extension at the end of the interlock 80 is properly positioned to fit within a slot 103 formed in the launch block 32 for exactly that purpose. Thus, the interlock 80 operates not only as an interlock 80 for the slide lock 76, but also for the entire caboose 58 fitting into the launch block 32.

After entering the opening 81, targets 82 on the back surface or rearmost surface of the caboose 58 are detected by sensors 83, such as proximity sensors 83. Meanwhile, a detent 84 or latch system 84 locks the caboose 58 into the launch block 32. For example, an actuator 85, such as a solenoid 85 may operate activating surfaces 86 in order to engage the contacts 87a, 87b between the frame 77 of the caboose 58, and the launch block 32.

The detent 84 may have a spring 88 provided by a spring force favoring engagement. Thus, the actuator 85 may withdraw the detent 84 only upon receiving the proper signal of control (e.g., from the controller 40) and the power required to operate the actuator 85 to withdraw the detent 84. Typically, the registration face 89 on the launch block 32 will fit against the detent 84.

In various embodiments, an actuator 90 or trigger 90 may operate to withdraw the detent 84 from contact 87a, 87b between the detent 84 and the frame 77 of the caboose 58.

The caboose 58 may be secured by various fasteners 91 or bolts 91. Some may serve as dual purpose fasteners 91, such as the axle 91a. Each of these fasteners 91 may be secured by a keeper 92 or threaded directly into one of the side plates 94. Spacers 93 may maintain a distance between the side plates 94. Meanwhile, the brake shoe 59 or pad 59 also serves as a spacer 93 between the side plates 94.

The pad 59 and the top cage 75 are shaped to provide a way 95 or passage 95 sized to receive the track line 20. To fit the track line 20 into the way 95, the swing arm 61 must be removed from the pin 72, and rotated forward. Meanwhile, the top cage 75 must slide forward along its axle 96 until the clearance 97 has been taken up. By sliding, the slide lock 76 is freed from the constraint of the keeper 79c. Once free, pivoting of the slide lock 76 with the top cage 75 removes it from the relief region 78. Thus, as the top cage 75 pivots about its axle 96, the way 95 has been opened to release the track line 20 from capture therewithin.

The caboose 58 may include a hanger 98 having an aperture 99 therein for receiving a fastener 63e, such as a carabiner 63e for a belay line. This line is a second level of protection in case of a failure of another component of the system 10.

For example, typically, the hanger 54 supports a sling 55 and harness 46. Meanwhile, the harness 46 on a rider 45 is also secured by a belay line (e.g., another sling 55) to the hanger 98 as an emergency precaution. Thus, the brake system 58 operates as an additional support capable of supporting a rider 45 on the track line 20. This support operates in even the most extreme condition of having the hanger 54 fail, or following a failure of the pin 72, the lever arm 52, the main frame 60 or the like.

Referring to FIGS. 8A through 8F, while continuing to refer generally to FIGS. 1 through 16, the interlock 80 may alternatively be configured as a spring-loaded or an elastically deflecting interlock 80. In this embodiment, the interlock 80 is formed to spring out away from the relief region 78. Meanwhile, a button 101 extends above the surface of the remainder of the interlock 80.

In this embodiment, the slide lock 76 pivots into place, under force, thereby depressing the button 101 and deflecting the interlock 80. Once the slide lock 76 has depressed the button 101, and entered fully into the relief region 78, the slide lock 76 is in a position to slide rearward under the keeper 79c.

As the slide lock 76 slides with the top cage 75 rearward, the slide lock 75 fits under the keeper 79c. Once clear of the interlock 80, the slide lock 76 passes off and releases the button 101, permitting the interlock 80 to spring back out.

Once in the outer or unstressed position, the interlock 80 obstructs and prevents the slide lock 75 from moving forward out from under the keeper 79c. The button 101 then protrudes to interfere, and thereby acts as a restraint against motion of the slide lock 76 in a forward direction. Thus, the top cage 75 is prevented from moving forward and out of a locked position.

The slide lock 76 may be released by depressing the button 101, thus deflecting the interlock 80 sufficiently to permit the slide lock 76 to slide forward with the top cage 75. Once forward, and completely clear of the keeper 79c, the slide lock 76 may pivot up with the top cage 75 about the axle 96 to an open position.

Figure 9C:
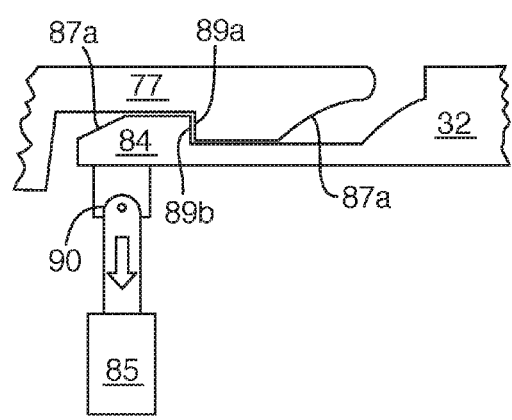
FIG. 9C is a top plan, cutaway view of an alternative latch and release mechanism for securing a trolley to a launch block.

Referring to FIGS. 9A through 9C, while continuing to refer generally to FIGS. 1 through 16, various alternative mechanisms may exist for securing the caboose 58 within the launch block 32. For example, some portion of the frame 77 may fit within the launch block 32. A latch 84 or detent 84 may be operated by an actuator 85, such as a solenoid 85. Typically, the latch 84 may have a spring 88 or spring portion 88 that biases the latch 84 into engagement with the frame 77. For example, registration surfaces 89a, 89b may engage to capture the frame 77 by the latch 84 of the launch block 32. Upon operation of the actuator 85, the spring 88 may be overcome, withdrawing the latch 84 from engagement with the frame 77.

Engagement may occur by contact between the contact surfaces 87a, 87b. The contact surfaces 87a, 87b may first come into contact by relative motion (linear translation) between the frame 77 and the latch 84 of the launch block 32. The contact surfaces 87a, 87b engage, thus driving the latch 84 away from the frame 77. Eventually, upon coming to a proper registration position, the surfaces 89a, 89b pass one another, clearing for engagement. At this point, the spring 88 biases the latch 84 to slide into engagement with the frame 77. Again, the actuator 85 may overcome the bias of the spring 88, and withdraw the latch 84, thus removing the surfaces 89a, 89b from engagement with one another.

Figure 10:
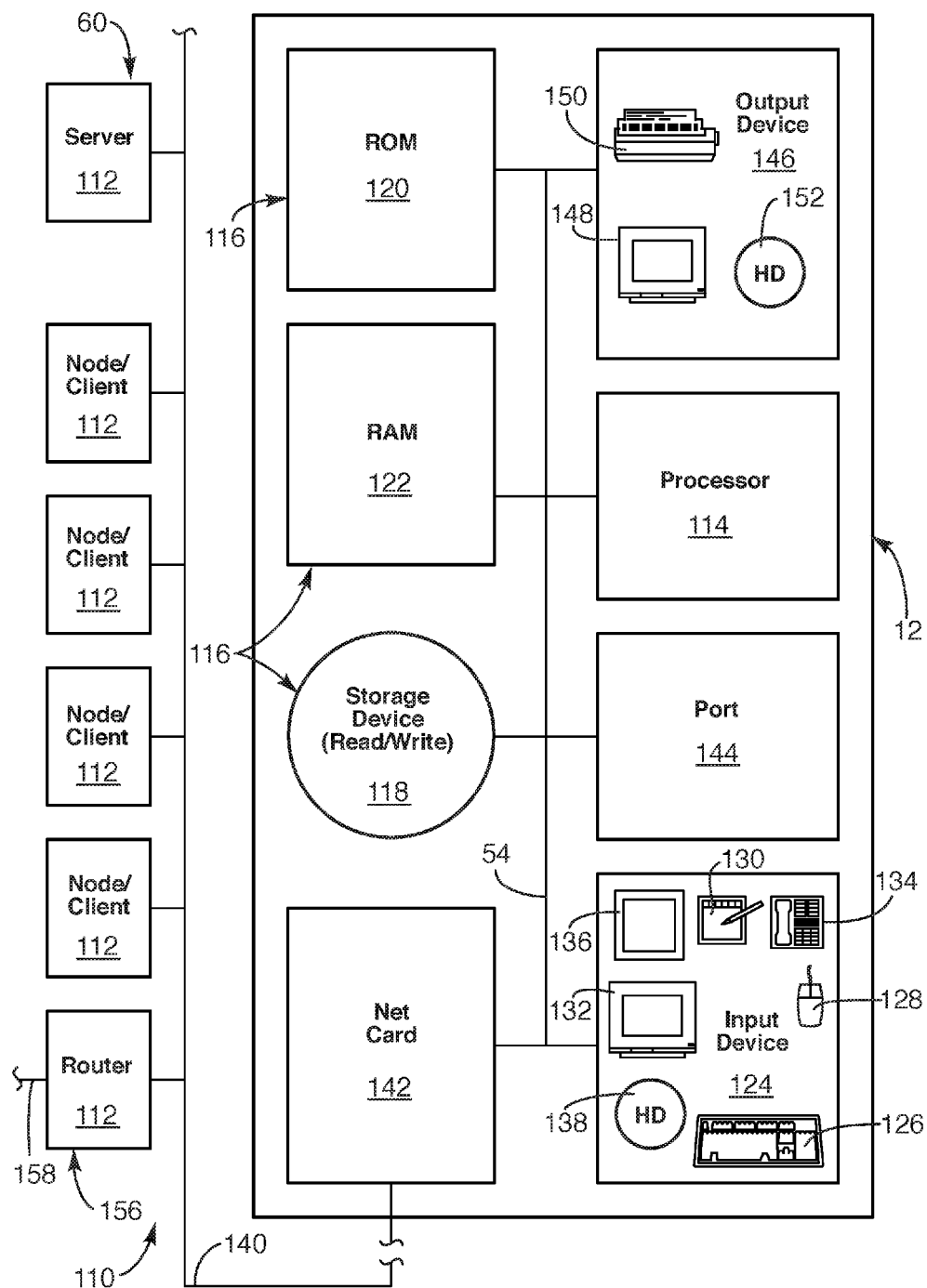
FIG. 10 is a schematic block diagram of one implementation of a computer system for providing computer services, and is simply an example as any or all of the components may operate and communicate in any of a variety of architectures and protocols, respectively, known in the art, including a master with distributed processing for reading, reporting, or otherwise communicating and processing information during operation of a system in accordance with the invention.

Referring to FIG. 10, an apparatus 110 or computer system 110 for implementing the electronic and control functions in accordance with the present invention may include one or more nodes 112 (e.g., client 112, computer 112). The text hereinafter is used only by way of example of a conventional network. Numerous topologies, hardware, and protocols may be used to implement a processor, its central or its peripheral components connected to it, and its command language.

This patent application does not intend to limit the system to using a centralized control system. Thus one may think of FIG. 10 as one embodiment of a computerized "supervisory control system." Other hardware, communication protocols, and the like may be used, and more or less processing of information, including no "processing," such as switches, relays, interlocks, and so forth that react to a state or condition without processing logic programmed in by software.

More generally, a supervisory control system 40 may encompass a centralized control system, where status information and other data 42 is brought to a centralized node 112 for processing and from which instructions 44, commands 44, and directives 44 are issued. Alternatively, one may rely on a distributed control system, also known as a dispersed control system, where status information 42 and other data 42 is brought to a local node 112 for processing and exchange with other nodes 112 and from which issues instructions 44, commands 44, and directives 44. For example, a peer-to-peer network where common tasks are shared rather than centralized, or where individual devices connect as a "mesh network," may be relied upon.

One currently operable embodiment may rely on a computerized control system that includes a "master computer," "master controller," "computer system," or the like that could instead be implemented using (artificial) neural networks, other artificial intelligence schemes, or even relays as cited above. Suffice it to say that the schematic block diagram of FIG. 10 should be viewed as providing blocks representing hardware, software, or their functionality, regardless of hardware, topology, and protocol. Thus a classical "bus" network illustrated is by way of example, since topology, hardware, and protocol are not the point, but the functioning, safety, decisions, and operator free system are enabled by a suitable suite. That Suite may use old or new hardware, topology (e.g., "ring," "mesh," etc. etc.).

In this regard, a computer model described is sometimes referred to as the "von Neumann" model or architecture, also known as the Princeton model. While the von Neumann model computer is most common, other architectures, such as the Harvard model, are also available for stored program computers. Non-bused architectures are also available, such as those in artificial neural networks, and can be either digital, analog, or a hybrid of both. Thus, implementation of the invention by the example illustrated is not limiting, but an example. The use of any or all computer systems, software, commands, languages, and communication schemes available should be considered to be within the scope available embodiments of systems in accordance with the invention.

Nodes 112 may each contain a processor 114 or CPU 114. The CPU 114 may be operably connected to a memory device 116. A memory device 116 may include one or more devices such as a hard drive 118 or other non-volatile storage device 118, a read-only memory 120 (ROM 120), and a random access (and usually volatile) memory 122 (RAM 122 or operational memory 122). Such components 114, 116, 118, 120, 122 may exist in a single node 112 or may exist in multiple nodes 112 remote from one another.

In selected embodiments, the apparatus 110 may include an input device 124 for receiving inputs from a user or from another device. Input devices 124 may include one or more physical embodiments. For example, a keyboard 126 may be used for interaction with the user, as may a mouse 128 or stylus pad 130. A touch screen 132, a telephone 134, or simply a telecommunications link 134, may be used for communication with other devices, with a user, or the like. Similarly, a scanner 136 may be used to receive graphical inputs, which may or may not be translated to other formats. A hard drive 138 or other memory device 138 may be used as an input device whether resident within the particular node 112 or some other node 112 connected by a network 140. In selected embodiments, a network card 142 (interface card) or port 144 may be provided within a node 112 to facilitate communication through such a network 140.

In certain embodiments, an output device 146 may be provided within a node 112, or accessible within the apparatus 110. Output devices 146 may include one or more physical hardware units. For example, in general, a port 144 may be used to accept inputs into and send outputs from the node 112. Nevertheless, a monitor 148 may provide outputs to a user for feedback during a process, or for assisting two-way communication between the processor 114 and a user. A printer 150, a hard drive 152, or other device may be used for outputting information as output devices 146.

Internally, a bus 154, or plurality of buses 154, may operably interconnect the processor 114, memory devices 116, input devices 124, output devices 146, network card 142, and port 144. The bus 154 may be thought of as a data carrier. As such, the bus 154 may be embodied in numerous configurations. Wire, fiber optic line, wireless electromagnetic communications by visible light, infrared, and radio frequencies may likewise be implemented as appropriate for the bus 154 and the network 140.

In general, a network 140 to which a node 112 connects may, in turn, be connected through a router 156 to another network 158. In general, nodes 112 may be on the same network 140, adjoining networks (i.e., network 140 and neighboring network 158), or may be separated by multiple routers 156 and multiple networks as individual nodes 112 on an internetwork. The individual nodes 112 may have various communication capabilities. In certain embodiments, a minimum of logical capability may be available in any node 112. For example, each node 112 may contain a processor 114 with more or less of the other components described hereinabove.

A network 140 may include one or more servers 160. Servers 160 may be used to manage, store, communicate, transfer, access, update, and the like, any practical number of files, databases, or the like for other nodes 112 on a network 140. Typically, a server 160 may be accessed by all nodes 112 on a network 140. Nevertheless, other special functions, including communications, applications, directory services, and the like, may be implemented by an individual server 160 or multiple servers 160.

In general, a node 112 may need to communicate over a network 140 with a server 160, a router 156, or other nodes 112. Similarly, a node 112 may need to communicate over another neighboring network 158 in an internetwork connection with some remote node 112. Likewise, individual components may need to communicate data with one another. A communication link 134, wired or wireless may exist, in general, between any pair of devices, anywhere.

Figure 11:
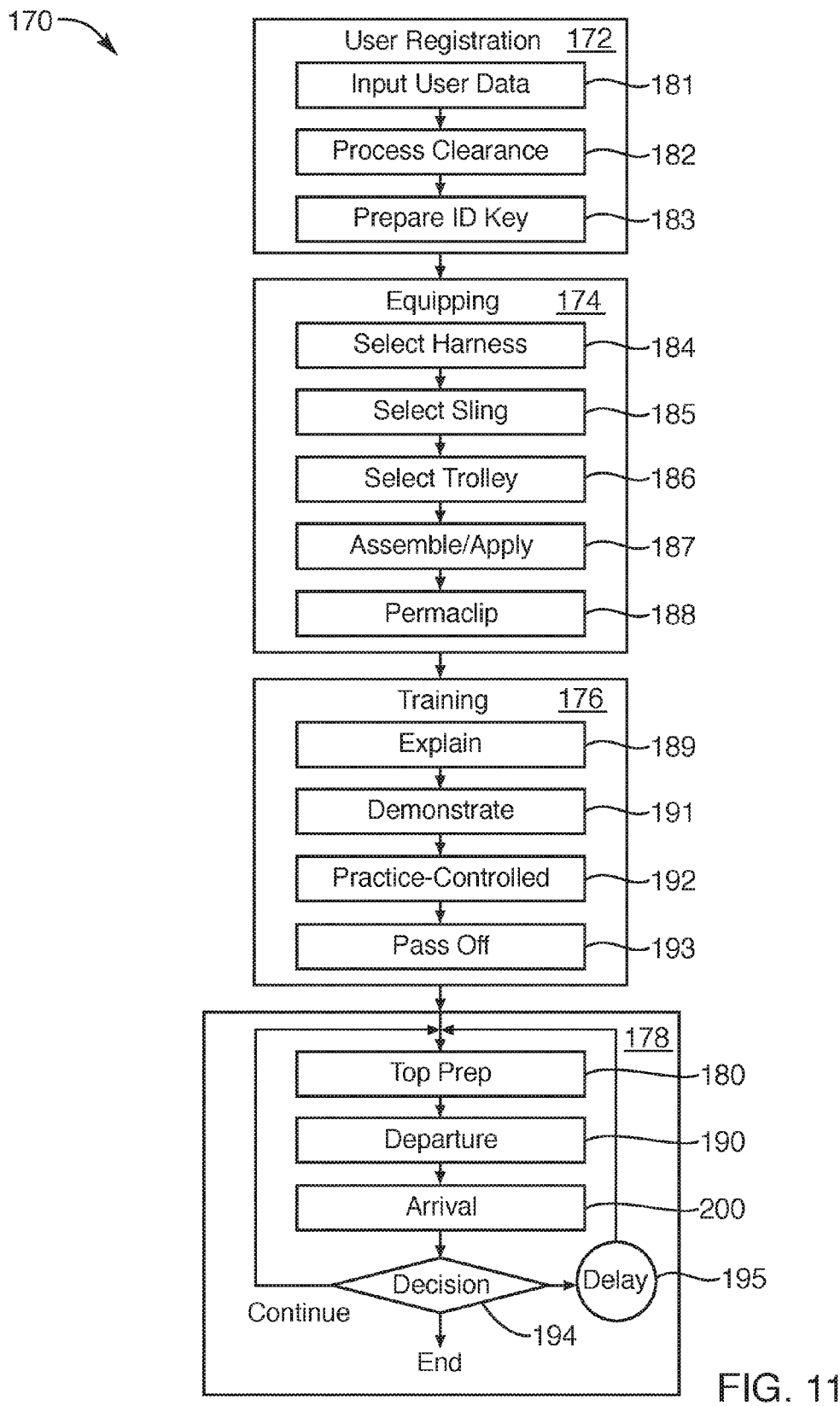
FIG. 11 is a schematic block diagram of a process for registration, equipment, training, and operation of a system in accordance with the invention.

Referring to FIG. 11, while continuing to refer generally to FIGS. 1 through 16, a process 170 for operating a system 10 in accordance with the invention may include several sets of procedures. For example, user registration 172 may be very important. For example, tracking users, their locations, their time at that location or at detection when arriving or leaving, and the like all constitute important facts to be managed by the master controller 40 in providing access, operation, and safety within the system 10.

A comparator may compare data values in memory against the data acquired by the readers 15, 25 as users 45 pass in and out of the upper station 12 and lower station 22. Meanwhile, logical decisions can be programmed to implement the decisions, reporting, tracking, and data values read by the readers 15, 25 from targets 35 associated with individual users 45 at the various times, databases of authorizations, clocks in the computer system 110, and so forth.

Thus, for example, the individual blocks in the processes of FIGS. 1 through 16 may be interpreted as programmatic hardware devices, actions and decisions of such hardware devices in the system 10, software "executables" (coded groups of programming instructions executable by a processor 112) running on computer and controlling hardware, or a combination thereof. Schematically, lines represent passage of information outputs from one block to another, and passing of control or operation to a next step and next device.

Likewise, equipping 174 each rider 45 must be done individually and with due care. Each rider 45 must be equipped with a harness 46 or other mechanism 46, in order to ride under a trolley 50 traveling along a track line 20.

Accordingly, safety requires assuring that all equipment is properly fitted, installed properly or properly arranged on the person of a rider 45, and safety checked. The system 10 assures that locked mechanisms remain locked as they should be and operating components are operational as they should be.

Training 176 is another unique procedure in a system 10 in accordance with the invention. Training occurs for rider 45 who arrives at a venue containing a system 10 in accordance with the invention. Typically, in safety rescue and the like, operators or cable riders may be trained periodically and certified regularly. Amusement rides rely on trained attendants to enforce simple, posted procedures. However, in a system 10 in accordance with the invention, individual riders 45 will be trained to operate without the presence of an attendant. Thus, each rider 45 must necessarily be trained 176 in use and operation of all necessary equipment, including the proper entry and exit from the stations 12, 22.

Rider operations 178 include the typical tasks required of each rider 45 in arriving in an upper station 12 and operating a trolley 50 secured to that user 45. This continues through the entire process of securement to the track line 20, descent, braking, termination, removal from the track line 20, and final exit from the lower station 22. This repeats before embarking on, and following completion of, each leg of a path or tour, through the very last station 22 thereof.

The user registration process 172 may typically involve inputting 181 user data. This may be done in any of several ways discussed hereinabove. For example, in one presently contemplated embodiment, a user 45 carries some type of detectable target 35 that contains and conveys information.

For another example, whether a magnetic card 35*b*, RFID tag 35*a*, bar code ticket 35*c*, mechanical key card 35*d*, an input string 35*e*, put into a key pad 37*e*, or other target 35*f*, 35*g*, user information needs to be input. At a minimum, it is important to track an individual user 45, trolley 50 attached thereto, or both by some universally distinct identifier. Thus, management of the population of riders 45 in an entire facility sponsoring a system 10 is possible, and necessary for safety.

Likewise, other data may be significant, including parameters such as weight, some record of locations traversed during a particular visit, or the like. For example, it is possible to keep track of the different legs or runs of a course that have been traversed by a rider 45. This may be helpful in trying to find a missing patron 45 at a venue when trying to close at the end of a day. Knowing where an individual has been or was last detected may be important.

Thus, inputting 181 user data may be done in any suitable manner, and may involve any quantity, large or small, of data of interest. Even demographic data, customer use data, and the like may be input 181. On the other hand, in certain embodiments, a rider 45 may simply need an authorization code. It may be that the individual rider 45 need not be individually identified and tracked, but simply needs to be authorized as being present and properly so.

Similarly, processing 182 a clearance involves verification of information and the grant by the master computer 40 of permission, authorization, or the like to an individual rider 45 to operate within the system 10. This may involve checking to make sure that training 176 has occurred, and may include certification that training 176 has been done recently, such as a day before or a week before. Thus, a user 45 or rider 45 may be exempted from training on a particular day, if a history of training and use so demonstrates.

Similarly, payment of access fees, proper fitting out with equipment or equipping 174 the rider 45, and the like may all be recorded as they occur. Thus, processing 182 may include authorization, pre-authorizing, or the like. The function of processing 182 a clearance is primarily safety of a user 45. This also implies release of an operator of the system 10, from liability as well as timely, smooth, comfortable throughput of riders 45 through the system 10.

Preparing 182 an identification key or an ID key may be completely electronic. It is also contemplated to involve preparation of some type of computer readable key that can be carried by a user 45. For example, any of the targets 35 discussed hereinabove may serve as a key.

Those keys 35 may be prepared 183 in any suitable manner to include user data that has been input 181. Data may reflect a clearance 182 that is required to access or operate a trolley 50 on the track line 20 or any track line 20 in the system 10, and so forth. One particular significant benefit to preparing 182 an ID key is that information may be carried on the key 35. Such will certainly be valuable to be read from the key 35 and reported to the master controller 40 in due course.

Equipping 174 a rider 45 may include numerous steps. However, some of the more significant steps may include selecting 184 a harness 46, of any particular type, which should certainly be fitted, adjusted, and otherwise installed on the person of a rider 45. Likewise, selecting 185 a sling 55 is not trivial. However, it may be fixed with sizing a harness 46.

Selecting 185 a sling 55 may primarily require selection of a length of sling 55 in order to provide access by a user 45 to the control mechanisms, such as the control handle 57 drawing on the tether 56. Typically, a smaller user 45 will need a shorter sling 55. Thus, selecting 185 a proper sling 55 may involve sizing for use in the system 10 for a particular user 45.

In certain embodiments, selecting 185 a sling 55 may be integrated with selecting 184 a harness 46. For example, a harness 46 will typically be sized for a comparatively taller and larger rider 45 or a smaller, and therefore shorter, rider 45. Thus, the sling 55 selected 185 may be selected 185 as part and parcel with the harness 46. One benefit of integrating the sling 55 with the harness 46, and therefore the selection 185 of a sling 55 with the selection 184 of a harness 46 is to simplify the procedure, to leave less room for error, and to provide for permanently fixed attachment mechanisms unalterable and non-removable by a rider 45.

Every attachment mechanism provides a place for error. Every time that attachment mechanism is opened or closed, an opportunity for error and compromise of safety is possible. Thus, in one contemplated embodiment, the sling 55 is permanently secured by a link 63*e* to the vertical tie 63*d* of a harness 46. In this way, once a harness 46 is properly installed on a rider 45, no chance for improperly opening or improperly closing any attachment would be possible.

Selecting 186 a trolley 50 will typically be a function not integrated with selecting 184 a harness 46, and selecting 185 a sling 55. Typically, a system 10 will require fewer trolleys 50 than individual harnesses 46. For example, several harnesses 46 will be required in a multitude of sizes in order to accommodate riders 45 of the system 10 on any given day.

In contrast, only one type of trolley 50 need be available. Trolleys may larger or smaller, heavier or lighter, and so forth. However, the trolleys 50 are typically made sufficiently strong that any of the trolleys 50 is sufficiently strong to carry any rider 45 of virtually any height and weight.

Nevertheless, a smaller or lighter trolley 50 may be appropriate for a smaller and lighter user 45. This makes sense, since younger persons, smaller persons, and the like will of necessity be carrying their trolley 50 assigned to them whenever they are not "clipped in" to a track line 20. Thus, any individual should have a trolley 50 selected 186 to be of a proper weight for carrying. Typically, a user 45 may carry a backpack or slide-sling pack and place the trolley 50 in that pack when not riding any track line 20.

Assembling 187 or applying 187 the harness 46, sling 55, trolley 50, and so forth may involve one or more steps. For example, in the event that the harness 46 and sling 55 are integrated, then a trolley 50 may be selected 186 and assembled 187 therewith. Likewise, a user 45 will necessarily need to be fitted with and climb into a harness 46 for travel. Even a seat-type harness 46b may be carried with a user 45, and may simply remove from the line 20 and hang behind a user 45 when the user 45 is not riding the track line 20.

Assembling 187 may include assembling various links 63g, and possibly 63e. Typically, only the link 63g is ever opened, and then only during outfitting. In fact, the concept of a permaclip 188 step is the fixation of a link 63g connecting a trolley 50 securely to a harness 46 in a manner to be non-removable by an individual rider 45. Thus, the permaclipping 188 may involve linking the trolley 50 to the sling 55 with a carabiner 63g, a carabiner 63e to a harness 46, or both. All links 63e, 63g opened should be temper proof. They may require a key, specialized tool shape, be sealed with a witness tag or other seal mechanism, or a combination. Thus, the individual rider 45 is not equipped to do, nor capable of doing, any opening of the lock or removing the seal. Thus, safety may be ensured in that no link 63e, 63g may be opened by an individual rider 45 during the day.

Training 176 may include explaining 189 to an individual rider 45 or group of riders 45, demonstrating 191 operation of all equipment provided 174, as well as practicing 192 in a controlled environment. An individual 45 should pass off 193 the training 176 before being permitted to operate the system 10 alone.

Typically, training 176 has the objective of competence by riders 45 in operating the system 10 or in operating trolley 50 on the system 10. To that end, training 176 is instituted to develop competence and prove that competence by every rider 45 before being entrusted to mount a trolley 50 to the track line 20, remove it therefrom, and operate it along a particular leg of a course.

Explaining 189 may involve manual instruction, providing handbooks, combining a reminder card or small leaflet or card providing key instructions. Explaining 189 will also typically take the form of video explanations. For example, a trainer in a video presentation may explain each of the component parts of the system 10, including the details hereinabove of the track line 20, the gate 30, the launch block 32, the trolley 50, and so forth. Typically, explaining 189 will involve explaining the safety significance of each instruction. Likewise, explanations of signage at a facility on which a system 10 is installed, and so forth may be explained.

Demonstrating 191 may include manual, live, video, or other demonstration techniques. It is contemplated that a trained person must pass off 193 each rider 45 before that rider 45 has passed off 193 skills. Only then is a rider permitted to take a trolley 50 and harness 46 and approach any of the stations 12. However, demonstrating 191 may effectively be done by video presentations of operation and sequences of steps. For example, a recorded or live demonstration may serve to inform. However, a live demonstration permits questioning. By the same token, a recorded presentation may be repeated, backed up, and rerun at the request or control of a particular user 45. Thus, each has advantages.

In one currently contemplated embodiment, passing off 193 may include passing a written test to verify that certain instructions are understood, signs are read and understood, mechanisms are properly named, remembered, and understood operationally, and so forth. Thus, one may view a demonstration 191 on a computer monitor, television, or the like, and respond to a questionnaire that performs a part of passing off 193 an understanding of the knowledge so demonstrated 191.

Practicing 192 under controlled supervision or in a controlled environment is contemplated to be extremely valuable. Regardless of what a person understands or remembers, being able to actually operate a trolley 50 on a track line 20 must be completed unattended by professional help. A system 10 is far more valuable and cost effective if the labor cost of attendants at every station 12, 22 is replaced by personal knowledge and responsibility by a rider 45.

Thus, practice 192 is contemplated as constituting at least a portion thereof supervised by a human being as an instructor in a limited area where the practice 192 may be overseen at each step. Similarly, by having practice 192 conducted in a limited environment or controlled environment, a rider 45 is not exposed to the potential harm that could result from an error at a remote, dangerous, and unattended location.

It is contemplated that several track lines 20 of comparatively short length, meaning that they involve a ride of only a few seconds, probably not even close to a duration of minutes, may be set up in a controlled area. Users 45 may open and close components of the trolleys 50 as they prepare them and connect them to track lines 20. The users 45 may then descend on a track line 20 arrive at a lower station 22, unclip the trolley 50 from the track line 20 and repeat the procedure as often as deemed necessary or desired. Thus, a rider 45 may develop a degree of comfort, unattended, in a controlled environment, wherein speeds are comparatively low, distances are not great, a user 45 is within sight and sound of an instructor or supervisor, and the distance to ground is sufficiently small to present effectively no significant danger.

Ultimately, a human supervisor should complete passing off 193 or should certify 193 that a rider 45 has passed off 193 all of the skills required to operate a trolley 50 on a track line 20 in the system 10. The nature and mechanics of operation of the various stations 12, 22, traffic patterns, readers 15, 25, various access and tracking portals 16, 26, access controls 17, 27 and physical barriers 18, 28 may all be practiced 192 and passed off 193 during the training 176 for use.

In one currently contemplated embodiment, the rider operations 178 may include top preparation 180 at an upper station 12. Following proper preparation 180, the master controller 40 may enable the proper controls, such as the cable close gate 30 to permit a user 45 to depart 190 from the upper station 12. Ultimately, upon descent, a rider 45 will arrive 200 and conduct the arrival 200 procedures. Thereafter, a user 45 may decide 194 whether to continue onto another upper station 12 and another portion or segment of track line 20.

Alternatively, a user 45 may delay 195 any further travel. For example, a user 45 may determine to take a hike in the vicinity, stop and view wildlife or scenery, or otherwise remain in the vicinity of a particular lower station 22. Thus, between any lower station 22, and the next upper station 12 in order, a user 45 may decide 194 to continue, stop, or delay 195. Of course, various details are associated with the preparation 180, departure 190, arrival 200, and the decision 194 on how to proceed after arrival 200 at a lower station 22.

Figure 12:
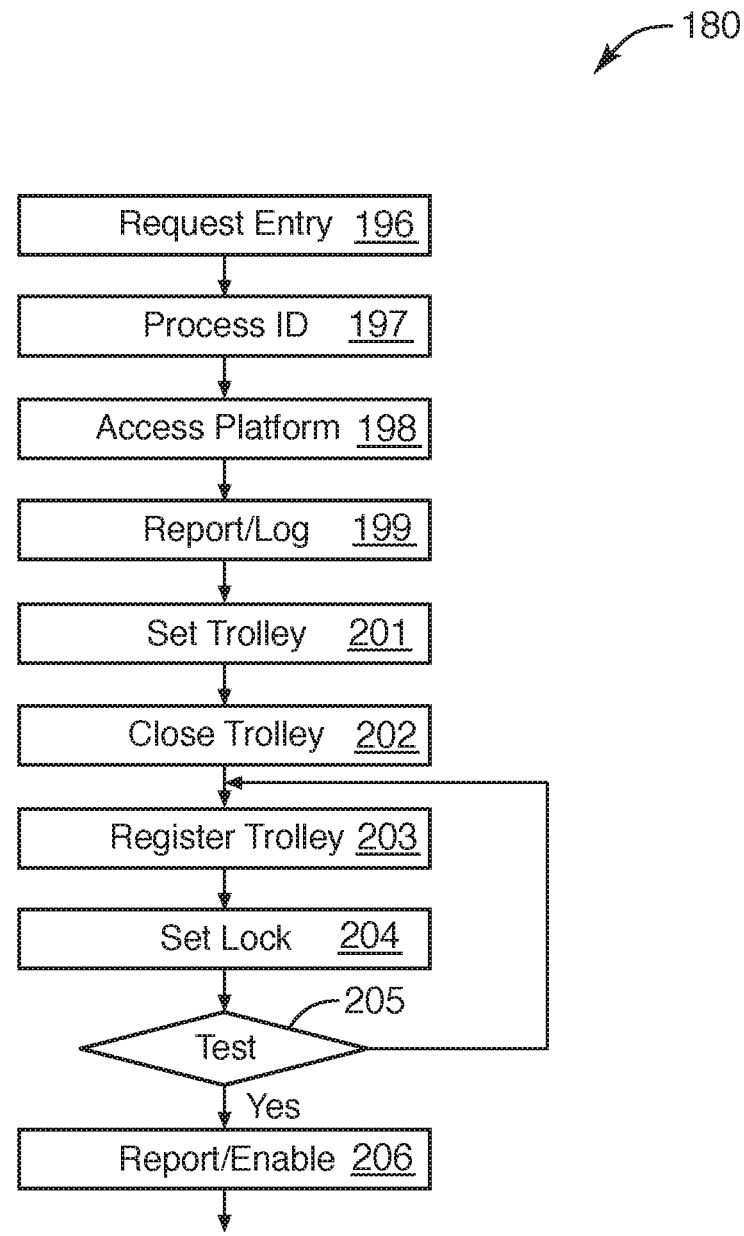
FIG. 12 is a schematic block diagram of a top preparation process for operating a system in accordance with the invention.

Referring to FIG. 12, the top preparation process 180 is illustrated. The top preparation 180 may begin with a request 196 for entry to the upper deck 14 of an upper station 12. In some embodiments, a user 45 may freely enter. In other embodiments, the upper fence 13 or railing 13 restricts entry until a request 196 has been processed. This provides for control of the number of persons who may be present during the loading of an individual rider 45. In some circumstances, having other persons in the same party on the deck 14 at the same time may not be a danger.

For example, a user 45 will typically exit from one side of a deck 14 or one edge of the upper deck 14. Thus, everyone else should be behind the launch location of a particular rider 45. On the other hand, the presence of others involves distractions and may result in risks to individual riders 45. Thus, the request 196 may be refused if another individual is still waiting to leave on a track line 20 from an upper station 12. One resolution of this dilemma is not to permit another person on the upper deck 14 until the previous rider 45 has already locked in to the launch block 32, and is ready to proceed to leave the upper station 12.

Typically, in response to a request 196 for entry onto the upper deck 14, the master controller 40 may process 197 the identification presented by a rider 45. For example, any of the types of targets 35 discussed hereinabove may be presented as an identifier 35 for a rider 45, the trolley 50 used thereby, or both. Processing 197 may involve verification that the rider 45 has been trained, is in the proper area, is otherwise authorized to be at that location, and safely so.

In some embodiments, processing 197 may involve opening interlocks or authorizing access. In some embodiments, processing 197 may deny access 198 by a rider 45 until the upper deck 14 is cleared. In other embodiments, the processing 197 provides access 198 of a rider 45 to the upper deck 14 or platform 14 so long as another rider 45 is in the same party. In yet other embodiments, access 198 may be denied until the upper deck 14 is completely clear, and any rider 45 on the track line 20 has already arrived 200 at the lower deck 24, and unclipped or disconnected from the track line 20. In yet other embodiments, a rider 45 may be required to actually exit the lower deck 24 before anyone is admitted to the upper deck 14.

Nevertheless, it is contemplated that throughput may be engineered according to a safety protocol, and reliance on training. For example, so long as each individual user 45 is accounted for, and their presence is documented by the master controller 40 to be in a proper location away from a position of interference or danger, then a rider 45 may clip in (connect) a trolley 50 to the track line 20 at the upper deck 14, while someone else is already on the upper deck 14, but out of the way.

Similarly, a rider 45 may be clipped into the track line 20 at the upper deck 14, while others await on the upper deck 14 to clip in. Still, the cable close gate 30 will remain closed until the lower deck 24 is cleared to preclude any possible collision between a rider 45 descending the track line 20, and a rider 45 who has either not unclipped at the lower station 22, or has not exited the lower deck 24.

Thus, in general, accessing 198 the platform 14 or upper deck 14 may be limited to a single user 45, or certain users 45 who are trained and who are standing out of the way of the trolley 50 connecting to a track line 20 and preparing to exit the upper station 12. Meanwhile, access 198 may be denied until the lower deck 24 is cleared, but need not be. However, safety would demand that the lower deck 24 be clear before any user 45 with access 198 to the upper deck 14 is permitted to pass the cable close gate 30 at the upper station 12.

In the top preparation process 180 the reporting 199 and logging 199 may be multiple steps or considered a single step. For example, the portals 16, 26 may be single or multiple. In one currently contemplated embodiment, the portals 16, 26 may control through turnstyles 17, 27 or access controls 17, 27 access to the respective decks 14, 24. On the other hand, if multiple persons are permitted on a single deck 14, 24 (typically only an upper deck 14), then a degree of safety control may be appropriate or required.

For example, if multiple persons are traveling in a party, all may be admitted to an upper deck 14, but the system 10 should have a mechanism for assuring that obstruction, accidents, and the like do not occur. Accordingly, various portals 16 or check-in stations 16 may exist, requiring all riders 45 other than the individual leaving the launch block 32 on a trolley 50 to be away from the launch area, such as the launch gate 31. Thus, individuals may be required to account for their presence at a specific location a safe distance away from the launch block 32, and any launch gate 31. Otherwise, the risk of an individual falling from a deck 14 is increased. Particularly, in remote alpine areas, track lines 20 may pass over gorges, canyons, and the like. Within a comparatively short distance the elevation difference between a track line 20 and underlying terrain may be over a hundred feet.

Thus, reporting 199 to the master controller 40, which will typically log 199 that information reported 199 may be thought of as a single operation, or separate steps since the readers 15 provided will typically report in, and the master controller 40 will typically log 199 that report 199.

A user 45 may set 201 a trolley 50 on the track line 20. This is a key skill that must be learned during the training 176 of a rider 45. Setting 201 the trolley 50 is typically a matter of opening a frame 60 and a brake system 58 (caboose 58). The frame 60 is typically opened by rotating a swing 61 or swing arm 61 about an axle 67 or pivot point 67 to provide an opening within the frame 60 into which the track line 20 may pass. In reality, it is the frame 60 that moves into a position around the track line 20. The track line 20 does not typically move.

Rather, the trolley 50 is lifted to the track line 20, with the swing arm 61 open in the frame 60. Thereby, the wheel 62 or roller 62 is engaged on the track line 20. Upon engagement of the track line 20 by the wheel 62, the swing arm 61 may be rotated or pivoted downward and rearward (where rearward is with respect to the ultimate direction of travel of the trolley 50). Thus, the track line 20 is captured within the frame 60, by the swing arm 61. In certain embodiments, the swing arm 61 may be provided with a slot that is 'L' shaped.

The slots 71a, 71b permit the swing arm 61 to receive a pin 72 fixed to the frame 60. The pin 72 moves into the foot of the 'L,' where the 'L' is actually upside down and backwards. In other words, the 'L' is flipped downward, or the leg of the 'L' flips down in rotation about the foot of the 'L' as an axis. Thus, the pin 72 passes into the rear side of the slot 71, as the swing arm 61 rotates downward and rearward.

Once the trolley 50 is supported on the track line 20 by the wheel 62 or roller 62, sometimes called a pulley 62, the frame 60 supports the entire trolley 50 on the track line 20, and the pin 72 drops in the slot 71a. For example, the lever arm 52, by virtue of its weight, drops down along the leg of the slot 71, thus capturing the swing arm 61 against any further movement. In this position, the swing arm 61 and the remainder of the frame 60 completely surround the wheel 62, the track line 20 captured therebelow, and secured to the lever arm 52. At this point, the trolley 50 is secure and non-removable.

By virtue of the support on both sides of the frame 60, by virtue of the frame 60 and swing arm 61 securing to the pin 72, the trolley 50 may be considerably lighter than other configurations. That is, no open frame nor cantilevered support is required. Since the pin 72 operates as an axle 72 for the pivoting of the lever arm 52, the frame 60 including its swing arm 61 provide adequate, secure, lightweight support for the trolley 50 on the track line 20.

Setting 201 the trolley 50 on the track line 20 typically involves opening the swing arm 61, as well as opening the brake system 58 or caboose 58. The swing arm 61 rotates forward about its axle 67 after the lever arm 52 has been lifted in the slots 71a, 71b formed in the frame 60 and swing arm 61. The slot 71b on the solid portion of the frame 60 is straight. The slot 71a on the swing arm 61 is L-shaped.

Thus, to set 201 a trolley 50 on a track line 20, it is necessary to open the frame 60 by swinging the swing arm 61 forward about its axle 67. It is likewise necessary to open up the brake system 58 or caboose 58 by releasing the interlock 74 thereof, thus releasing one side of the brake system 58 or caboose 58 to rotate or pivot away from the swing arm 61.

Thus, once the swing arm 61 swings forward to open, and the top cage 75 of the caboose 58 or brake system 58 has been pivoted away from the swing arm 61, the track line 20 fits under the wheel 62 in the frame 60, and passes over the brake pad 59 of the brake system 58. The forces applied by the wheel 62 and brake pad 59 create a "couple" as understood in engineering statics.

Closing 202 the trolley 50 illustrated here on the track line 20 involves rotating swing arm 61 circumferentially or arcuately downward and rearward to engage the pin 72 in the slot 71a.

The top cage 75 or closure 75 of the caboose 58 or brake system 58 may be pivoted across, toward the swing arm 61, to pass over the top of the track line 20. Thus, the closure 75 of brake system 58 or caboose 58 does not actually ride or continually contact the track line 20. Rather, the lever arm 52 tends to decline or drop, lifting the brake system 58 until the pad 59 contacts the bottom side of the track line 20.

In this position, the weight of a rider 45 suspended from the hanger 54 on the lever arm 52 by the sling 55 provides weight (e.g., force) on the lever arm 52, pivoting about the pin 72. The pin 72 or axle 72, acting as a fulcrum 72, elevates the brake system 58, applying leveraged force of the pad 59 against the bottom side of the track line 20.

The actual weight of a rider 45 suspended in a harness 46 on the tether 56 from the slide 54 provides the actual braking force. The details of operation of such a trolley 50 are described further and illustrated in the references incorporated herein by reference. Once the trolley 50 has been closed 202, the interlock system 74 is secured. This may be considered a subset of the step of closing 202 the trolley 50.

For example, the interlock system 74 includes a top cage 75 provided with a slide lock 76. The top cage 75 pivots toward the swing arm 61, and toward the track line 20 positioning the slide lock 76 within the frame block 77. The frame block 77 provides a substantial part of the support for the pad 59 in the braking system 58. The frame block 77 may be called a caboose block 77, since it forms the principal structure or supporting structure for the caboose 58.

The caboose block 77 or frame block 77 is provided with a relief portion 78 fitted to the slide lock 76. Thus, after the top cage 75 has been closed, the slide lock 76 comes into the relief 78 or fits into the relief 78 of the caboose block 77. The relief 78 includes both a main seat 79a, into which the slide lock 76 fits, and interlock seat 79b into which the foot of the slide lock 76, or a bottom most portion thereof may slide. Thus, the slide lock 76 fits into the relief region 78 extending below the outer surface of the frame block 77 or caboose block 77.

Thereafter, the rider 45 slides the slide lock 76 rearward (with respect to the direction of motion that the trolley 50 will eventually take) thus sliding the slide lock 76 under a keeper 79c. In this position, the slide lock 76 can no longer pivot out of the relief region 78. Moreover, the entire top cage 76 is now locked against the frame block 77 or caboose block 77. Meanwhile, another interlock 80 (dog 80) pivots down to drop into the relief region 78 just forward of the slide lock 76 in its rear-most position. Thus, the slide lock 76 is now trapped under the keeper 79c, unable to move forward in the relief region 78.

That is, the interlock 80 has dropped into the main seat 79a ahead of the slide lock 76 or in front of the slide lock 76. Thus, the interlock 80 or safety dog 80 has now interlocked the slide lock 76 into place, while the keeper 79c provides the force of a fixed relationship to the main seat 79a of the relief region 78. This arrangement fixes the slide lock 76 against any relative motion with respect to the frame block 77 or caboose block 77.

Referring to FIG. 12 further, while continuing to refer generally to FIGS. 1 through 16, the top preparation process 180 next moves to registering 203 the trolley 50 in the launch block 32. Registering 203 provides an additional interlock and reporting process.

For example, in the illustrated embodiment, the caboose block 77 may include various structural components, fasteners, and the like. In the illustrated embodiment, the caboose block 77 will fit substantially in its entirety, or at least its entire width, inside the launch block 32.

Also, for example, a launch block 32 may include an opening 81 or receiver 81 sized to fit the width of the entire caboose block 77 or frame block 77. Meanwhile, the caboose block 77 is provided with one or more targets 82 that are metallic, and specifically contain substantial iron. These targets 82 will be detected by sensors 83 such as proximity sensors 83 in the launch block 32. The rider 45 rolls the trolley 50 backward or rearward along the track line 20 to fit the caboose block 77 inside the receiver 81 of the launch block 32. The launch block 32 includes a detent, which may be a bar 84, a latch 84, or the like operated by an actuator 85 such as a solenoid 85.

Thus, an activating surface, typically associated with a protrusion 86 having a slope associated with it, or angle, will contact the detent 84, pushing the detent 84 some distance out of its equilibrium position. Upon reaching a contact surface 87a on the detent 84 by a contact surface on the caboose block 77, the detent 84 automatically moves into engagement, placing the contact surfaces 87a, 87b in contact with one another. Due to a spring 88 applying a bias force to the detent 84, the activating surface 86 effectively comes to an end at the contact surface 87b.

At that point, the contact surfaces 87a, 87b slide into engagement, urged by the spring 88 pushing the detent 84. Typically, the contact surfaces 87a, 87b are engaged when the targets 82 approach a registration face 89 on the launch block 32. Thus, the sensors 83 approach the registration face 89, typically making contact at about the same time or position that the contact surfaces 87a, 87b engage with one another.

Typically, the registration face 89 will represent a physical bumper position, and the targets 82 may actually be recessed slightly. Typically, targets 82 will be set away from the proximity sensors 83 a distance of from about one to about three millimeters. Thus, actual contact will typically not occur between the targets 82 and the sensors 83. Instead, the registration face 89 will contact the caboose block 77 with sufficient clearance to permit engagement by the contact surfaces 87a, 87b.

The proximity sensors 83 are thus engaged or activated to report once a user 45 has set 204 the detent 84 or lock 84. An audible click may be heard, and the trolley 50 will be secured to the launch block 32 by engagement between the launch block 32 and the caboose block 77.

Thus, setting 204 the lock 84 may be tested 205 both by physical observation that the trolley 50 is locked into the launch block 32, as well as by lights, or the like verifying that the caboose block 77 is secured within the launch block 32. Typically, reporting 206 or enabling 206 involves detection 206 indicating to the master controller 40 and other intervening devices, that the proximity sensors 83 are in sufficiently close proximity to the targets 82, thus indicating a proper positioning of the caboose block 77 of the trolley 50 with respect to the launch block 32.

Figure 13:
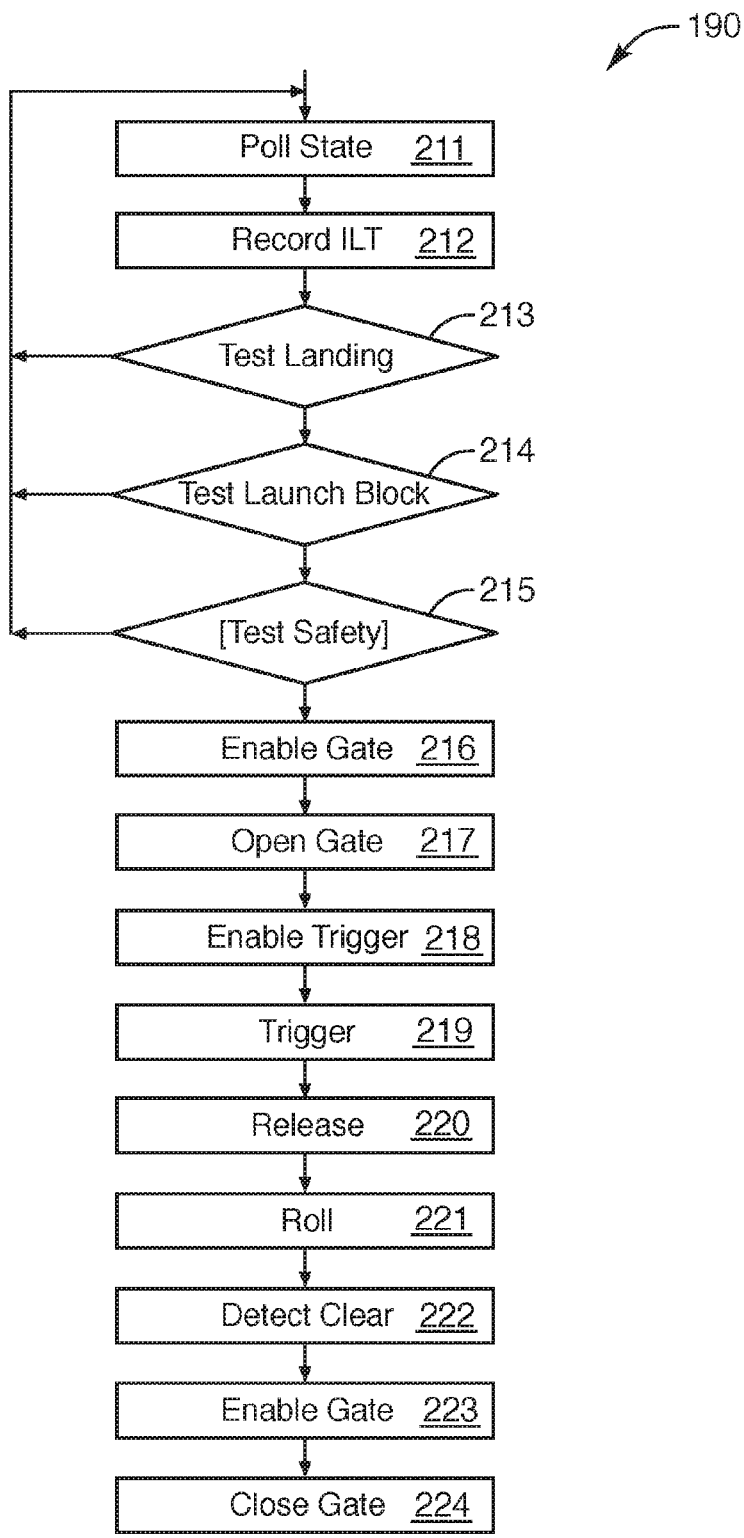
FIG. 13 is a schematic block diagram of a departure operation or process in a system in accordance with the invention.

Referring to FIG. 13, while continuing to refer generally to FIGS. 1 through 16, an actuator 90 may actually be thought of as a trigger 90 that will release the caboose block 77 from the launch block 32. Once free, the caboose block 77, fixed to the trolley 50, will descend along the track line 20. However, the departure process 190 involves numerous safety mechanisms or interlocking devices and procedures.

Typically, the departure process 190 involves polling 211 or reporting 211 a state of the various sensors in the system 10. For example, the condition of the readers 15 and the users 45 who have checked in with those readers 15 may be included in polling 211 or reporting 211 the status or state of the system 10. Likewise, the position of the cable close gate 30 is detected as safe. Moreover, the presence of the targets 82 sufficiently close to the proximity sensors 83 demonstrate that the trolley 50 is locked in place.

Meanwhile, the interlock system 74 includes a largely mechanical interlocking of the top cage 75, by the slide lock 76 securing the top cage 75 with respect to the caboose block 77. Meanwhile, if the slide lock 76 does not fit down into the relief region 78, then the caboose block 77 will not fit within the receiver 81 of the launch block 32. By the same token, if the slide lock 76 has not slid sufficiently rearward to permit the safety dog 80 or mechanical interlock 80 to fit down in front of the slide lock 76 in the main seat 79a of the relief region 78, then the safety dog 80 extends too far away from the outer perimeter of the caboose block 77. In this event, the caboose block 77 will not fit within the receiver 81.

As a practical matter, because the brake pad 59 may eventually wear, the brake system 58 or caboose 58 may eventually pivot, and rise with respect to the track line 20. Thus, space to accommodate vertical motion of the caboose 58 or brake system 58 within the receiver 81 is provided. However, clearance from side to side is sufficiently close between the caboose 58, and particularly the caboose block 77 and the side walls of the receiver 81, that only a properly closed and secured top cage 75 will be permitted to pass into the receiver 81. Thus, mechanical interlocks provide much of the safety.

However, the fact that the mechanical safety has been achieved is reported or reflected by the signals received from the proximity sensors 83. This is because the targets 82 cannot arrive within the proximity required by the sensors 83 unless all the mechanical interlock system 74 is properly in place. Thus, polling 211 or reporting 211 the status of all sensors to the master controller 40 assures that all mechanical and electrical systems are in the state required for safety.

Thus, recording 212 the identification of the rider 45 attached to the trolley 50, the location thereof, and the time of the recording 212 is received by the master controller 40. The master controller 40 may include a database system identifying all of these identifications, locations, times (ILT) recordings 212 or records 212 during operation of the system 10.

At this point, testing 213 at the landing deck 24 or lower deck 24 determines whether all riders 45 have cleared the space where the new rider 45 will land. Likewise, testing 214 evaluates the status of the launch block 32, as reported through the sensors 83. Other safety tests 215 may occur. For example, other persons not exiting the upper deck 14 on the trolley 50 may be required to report into portals 16 or various sensors or readers 15, which will record their ILT data. This is to verify that they are not in a position to endanger the rider 45 on the trolley 50, nor in a position to be endangered by movement of that rider 45. Various other safety tests 215 may be conducted by polling 211 or by virtue of the data reported 211 to the master controller 40.

After the testing 213, 214, 215, the cable close gate 30 is enabled 216. Enablement 216 may be thought of as activation and release. It provides for activity, clearance, or the reporting in to indicate that it has detected the proper event, or that the line 20 is cleared for activity, and possibly both.

Opening 217 the gate 30 amounts to moving the gate 30 away from the capture 66, to leave the trolley 50 enabled for action. Otherwise, the cable close gate 30 would be positioned to engage the capture 66 or capture hook 66 of the trolley 50, thereby prohibiting any launch or release of the trolley 50 to descend the track line 20.

Enabling 218 a triggering function is reported to and controlled by the master controller 40. Part of the functionality of the master controller 40 is to assure clearance of the launch platform 14 or deck 14 associated with the upper station, as well as verifying clearance of the lower station 22 and its landing deck 24 or platform 24. Thus, enabling 218 a trigger function permits the system 10 to function.

Triggering 219 by a user 45 typically involves mechanical release of a snap shackle 69 or the like. Meanwhile, triggering 219 also involves release from the launch block 32.

For example, a snap shackle 69a is a highly leveraged securement 69a in which a comparatively modest, virtually unloaded (without force), bracket 69a is secured about the catch 69b. Thus, the snap shackle 69a provides significant leverage advantage for the rider 45. Upon release of the pin 69c, by a rider 45, the snap shackle 69a is free to open. The comparatively small size and weight of the actuator element 69d causes the actuator element 69d to pivot, thereby releasing the catch 69b.

That is, the snap shackle 69a releases the catch 69b, as the actuator 69d moves out of engagement. Thus, the pivoting nature and the variable curvature of the actuator 69d provide a tremendous leverage advantage. This amounts to an effectively unloaded engagement between the pin 69c and the actuator 69d. Thus, a comparatively high load may be secured by the snap shackle 69*a* against the catch 69*b*. Yet, release requires very little force. Almost no frictional binding exists against the pin 69*c* in the actuator 69*d*. Thus, removal of the pin 69*c* easily releases the actuator 69*d*, which then has only its own weight to be moved by the force of the catch 69*b* against it.

Triggering 219 may be detected by the proximity sensors 83 or others detecting movement of the targets 82 out of their registration position with respect to the launch block 32. Thus, release 220 occurs. The release 220 may be thought of as a mechanical exit 220 of the trolley 50 from the engagement with the launch block 32.

Rolling 221 is the natural result of gravity acting on the loaded trolley 50 suspending the user 45 thereunder. Detecting 222 the passage of the trolley 50 past a suitable sensor 37 may involve any particular target 35 and a suitable sensor 37 along its path. Thus, rolling 221 of the trolley 50 past a particular location, where a target 35 may be detected by a sensor 37 results in detecting 222 that the trolley 50 is clear of the launch block 32.

The master controller 40, having received information from the testing 213, 214, 215, as well as detecting 222 the release 220 of the trolley 50 may enable 223 again the cable close gate 30. Accordingly, the gate 30 may close 224, precluding the release 220 or launch 220 of another trolley 50 from the upper station 12. At this point, all of the same clearances must be obtained before another trolley 50 can be triggered 219 and released 220 from the upper station 12.

Figure 14:
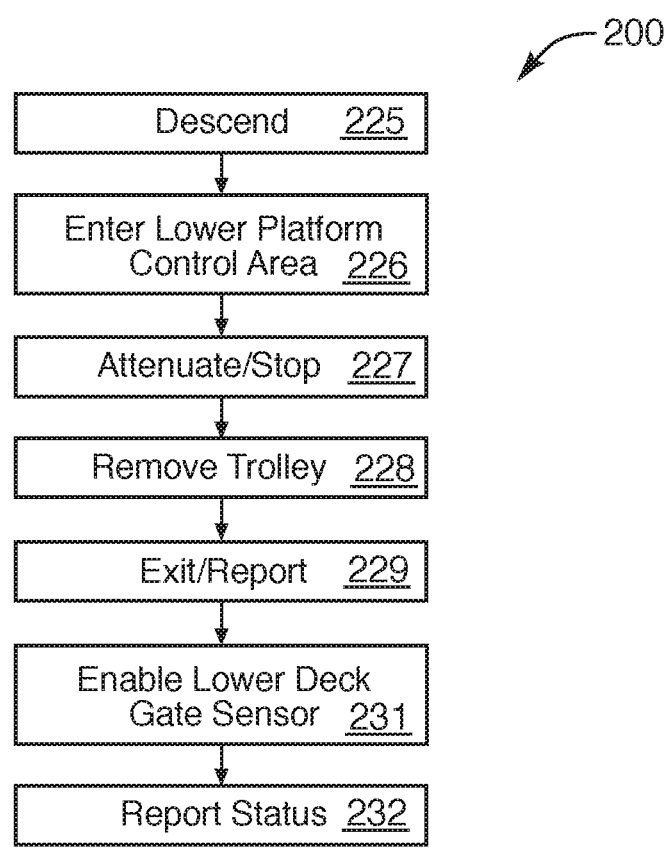
FIG. 14 is a schematic block diagram of an arrival operation or process in a system in accordance with the invention.

Referring to FIG. 14, a trolley 50 has an arrival process 200 involving the termination of the descent 225 or descending 225 from the upper station 12 to the lower station 22. Upon entering 226 the control area of the lower platform 24 or lower station 22, the trolley 50 will be attenuated 227. That is, the velocity, momentum, and energy thereof will be attenuated 227. This results in a stop 227. However, a stop 227 may be thought of as the end result of attenuating 227 velocity, momentum, and energy to values of zero. Attenuating 227 is discussed in detail in the references incorporated hereinabove by reference. Thus, that information is incorporated herein by reference, and is not repeated.

Removing 228 the trolley 50 involves releasing the entire top cage 75 of the caboose 58 in order to permit removal thereof from the track line 20. Similarly, the swing arm 61 is drawn down (e.g., moving the catch 6*b* up). The swing arm 61 may now be pivoted about the axle 67 away from the catch 69*b*. Thus, the engagement of the catch 69*b* by the swing arm 61 is removed.

The swing arm 61 swings forward, away from the caboose 58, thereby clearing an opening for the main roller 62 or wheel 62 to be lifted off the track line 20. Thus, with the top cage 75 also open (pivoted up and away from the main block 77 or frame 77 of the brake system 58), the trolley 50 may simply be lifted away from the track line 20.

Following removal 228 of the trolley 50, the trolley 50 may be tucked into a backpack, fitted into a sling or carrier suspended from the shoulder of a user 45, or the like.

Exiting 229 promptly may be quite important for throughput of the system 10. Exiting 229 or reporting 229 an exit 229 of a user 45 from the lower deck 24 should be imperative. Otherwise, the master controller 40 should not enable 216 the opening of the cable close gate 30 at the corresponding top station 12 or upper station 12.

In addition to the risk of a fall from one of the decks 14, 24, a collision between a rider 45 arriving at high speed at a lower deck 24 presents a risk of substantial injury. Thus, the exiting 229, reporting 229, or the like is a key safety provision enforced by the master controller 40.

Enabling 231 the lower deck gate sensor 231 involves the setting or triggering of a sensor 37 associated with the lower station 22. This verifies that the most recent rider 45 to arrive at the lower station 22 has cleared the deck 24, thus precluding any collision with an incoming rider 45 arriving thereat.

Reporting 232 may involve reporting all of the detections, including the arrival of a rider 45, removal of the trolley 50 from the line 20, the exit of a rider 45 from the lower deck 24, and so forth. Various detectors 37 may be implemented at the lower station 22 to provide assurances through the master controller 40 that safety protocols have been satisfied.

Figure 15:
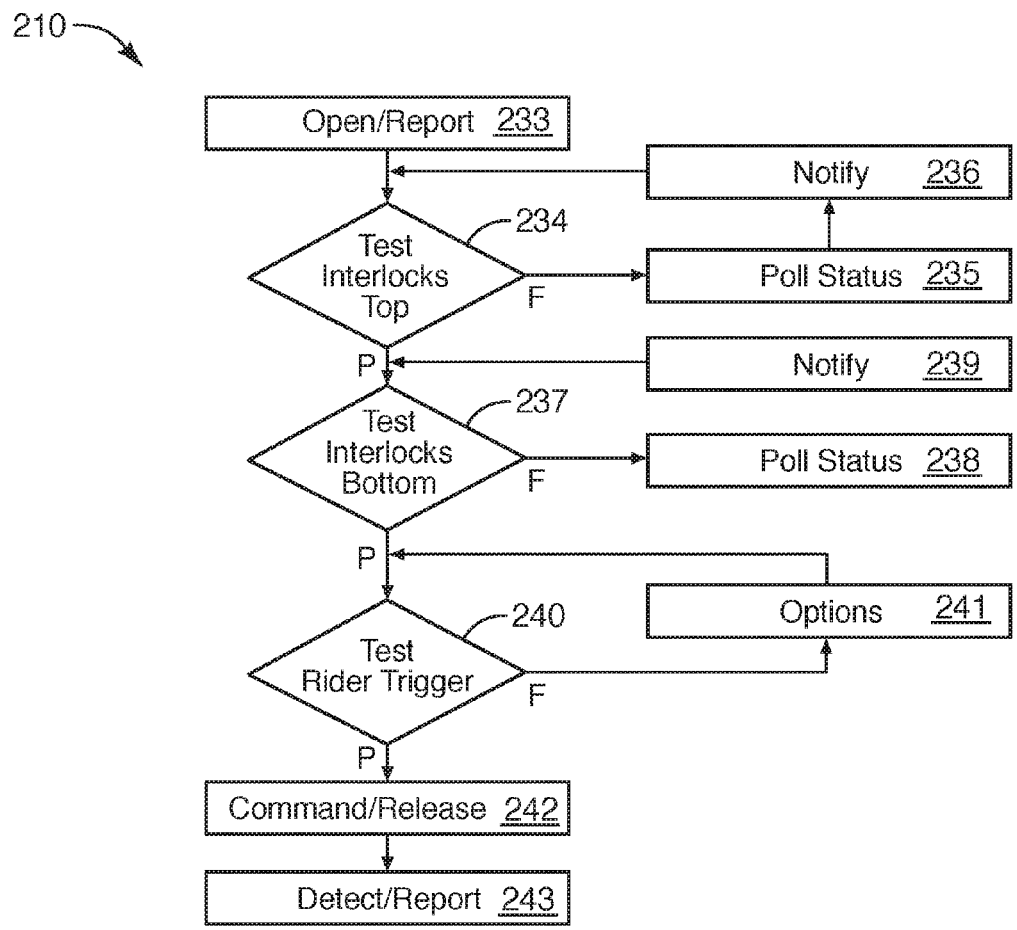
FIG. 15 is a schematic block diagram of an alternative embodiment of an interlocking and testing system for safety in the computerized control system of a zip line canopy tour system in accordance with the invention.

Referring to FIG. 15, in one alternative embodiment of a top platform safety procedure 210, a comparatively simplified embodiment may be implemented. For example, from a computer logic point of view, opening 233 involves reporting 233 the state of the cable close gate 30.

Testing 234 determines whether the interlocks associated with the top station 12 or upper station 12 have been satisfied. If they have not, then polling 235 the status thereof may result in a notification 236 back to the master controller 40 of the status. Until the interlocks controlling the upper station 12 have been satisfied, the test 234 will not permit a positive output. That is, a pass results in progress to the next test 237. A fail of the test 234 results in continued polling 235 and notification 236 of the master controller 40.

Testing 237 involves the testing 237 of the lower interlocks associated with the lower station 22. Again, failure of the test 237 results in polling 238 the status of all the elements associated with the lower station 22. Notification 239 of the status of the interlocks at the lower station 22 continues to follow up polling 238 or other test reporting 238 of the status of the various interlocks available. Eventually, when all the interlocks test 237 as safe, then a pass of the test 237 results in testing 240 regarding the rider 45.

Testing 240 of the rider 45 may trigger a failure. This results in the exercise of one of several options 241. In certain embodiments, a monitor and screen will provide for checking to determine where the limiting or controlling signal is originating. For example, a screen or monitor may display an instruction to check a particular connection, to check a registration, to reconnect, or the like.

For example, in registering with the launch block 32, a trolley 50 may have a mechanical interlock in the various components 79 and the interlock safety dog 80 that must mechanically fit into a receiving region 81. Proximity sensors 83 may detect a failure to register the trolley 50, and particularly the caboose 58, in the launch block 32. However, the safety dog 80 must clear or fit into its designated opening in the launch block 32. Also, the gauge length required for the snap shackle 69*a* to engage a catch 69*b* is a mechanical distance that must be met. It corresponds with drawing the trolley 50 within the launch block 32 a sufficient distance to provide detection of targets 82 by the proximity sensors 83.

Meanwhile, the proper positioning of a detent 84 that must be physically moved by an actuator 85, such as a solenoid 85, or the like may provide another electrical and electronic mechanism for detecting whether a trolley 50 is properly registered in a launch block 32.

Any of the clearance requirements corresponding to the upper station 12 or the lower station 22 may be presented on a screen. Colors, images flashing, or the like may indicate status. Such distinctions may thus provide verification and checking.

For example, a screen may present notices in red indicating that certain mechanisms are not engaged, cleared, or properly secured. Meanwhile, as each is cleared, the red printing and symbols of failure may be replaced by check marks or other symbols of success. Meanwhile, a message may be presented in another color, such as green. Thus, until all messages are green and cleared, one may or must concentrate on clearing any red messages with displayed symbols indicating failures.

Ultimately, the options 241 may include an ability to call to a central supervision site, buttons to notify the master controller 40, and the like. Thus, a rider 45 may be able to see results of a test, respond to the test 240, and particularly cure a failure to pass a test 240.

Once the test 240 is passed, the command 242 to release 242 the trolley 50 is literally executed by the rider 45 in person. Detecting 243 and reporting 243 may be done in combination, or in the alternative. This results in the master controller 40 receiving the information that the release 242 has occurred. The next event will be arrival 200 of another rider 45 and trolley 50 at the lower station 22.

Figure 16:
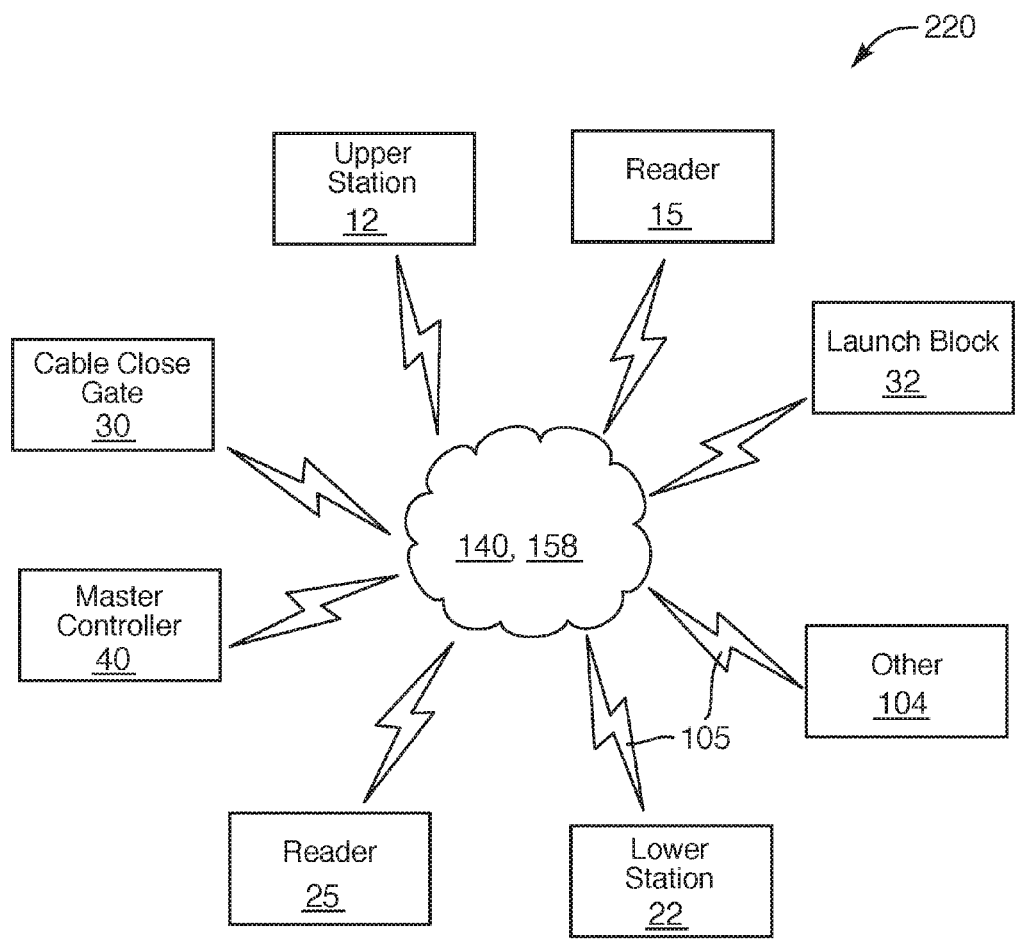
FIG. 16 is a schematic block diagram of one embodiment of a connection scheme between the various networked, computerized devices in the system.

Referring to FIG. 16, the various entities represented in a network 140 or internetwork 158 to the master controller 40 indicate that many physical apparatus may be provided with systems of sensors 37 detecting targets 35. These are monitored in order to report back to the master controller 40 and coordinate control of the system 10.

To this end, the network 140 or internetwork 158 may be either wired or effectively wireless. It may include links reflected by different bands or different frequencies of operation in wireless networks 140, 158. Also, again, each of the blocks in FIGS. 11 through 16 may be thought of as a step of a process in an "executable" (any program segment of steps implemented in instructions executable by a processor 112 to accomplish a function), a device, a firmware component, or a procedural step otherwise accomplished, or a device accomplishing the step.

Figure 17:
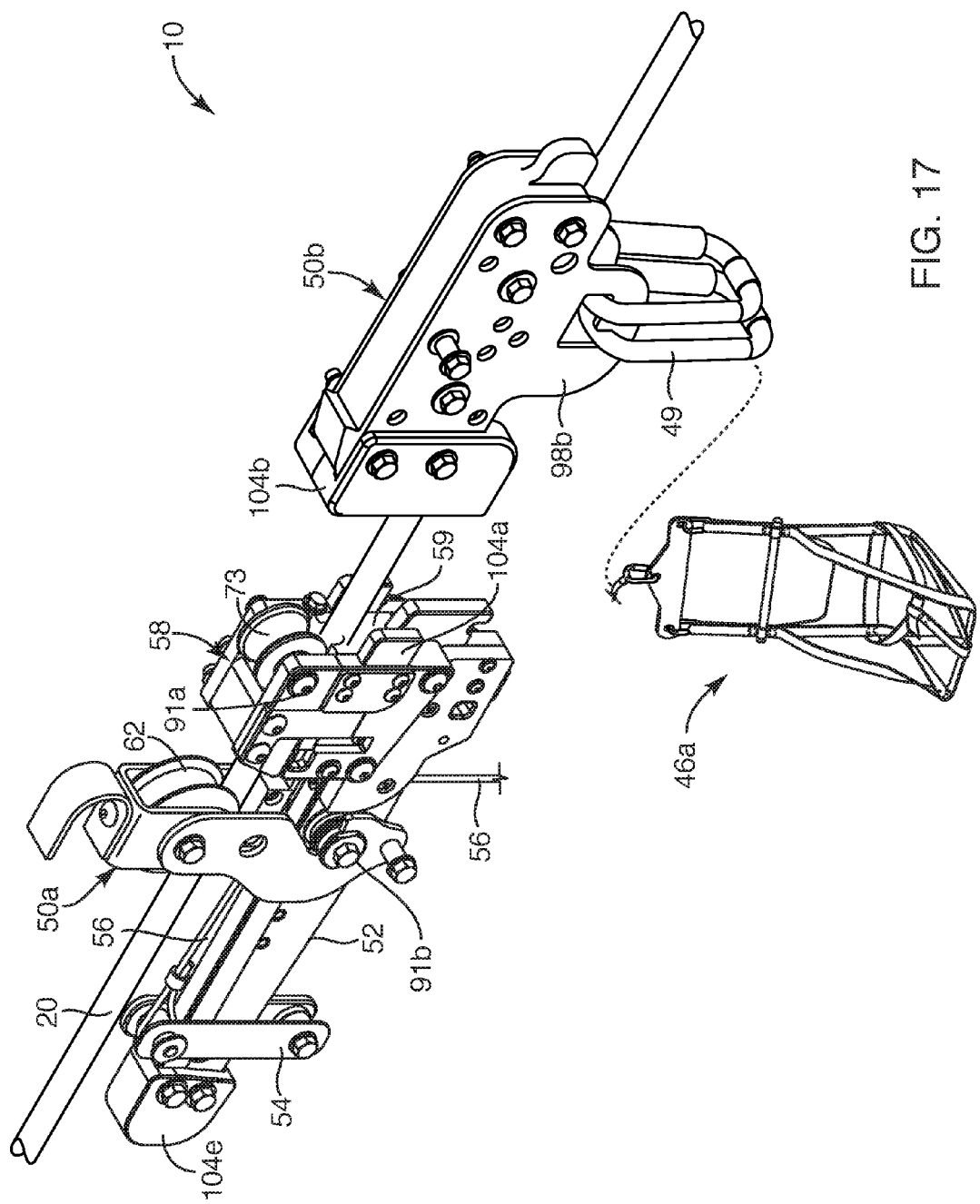
FIG. 17 is a perspective view of one embodiment of a pair of trolleys not yet engaged to run together, one braked by an operator and one unbraked by itself, but controlled by movement of the braked trolley.

Referring to FIG. 17, while referring generally to FIGS. 1 through 21, and particularly to FIGS. 17 through 21, a system 10 in accordance with the invention will typically involve one or more track lines 20 extending between an upper location and a lower location. Typically, track lines 20 may be suspended between towers, other man-made structures, or natural structures, such as trees. A track line 20 will typically suspend as a catenary, a term of art known in engineering, and used here in its common, ordinary, engineering meaning.

Track lines 20 may be suspended to run in multiple parallel paths. They may also be suspended in multiple legs of a longer tour. Typically, each leg has a beginning and end. Ends of adjacent legs of such a tour may be in proximity to one another permitting ready access therebetween by riders, but also providing the freedom to dismount from a track line 20 and hike, relax, observe, or wander before continuing on the next leg of the tour.

In the illustrated embodiments, riders 45 may be tracked by means of a target 35 associated with the rider 45, with the rider's harness 46, or with a trolley 50 that supports the user or rider 45 in a harness 46, traveling along the track lien 20. Typically, a harness 46 containing a rider 45 is connected by a link 49, such as a carabiner secured between the harness 46 and the trolley 50.

Again, harness 46 is a word well understood in the arts of climbing, mountaineering, "high angle" work, working high above the surface of the earth, such as suspending over the sides of buildings, military operations, search and rescue, and so forth. Harnesses 46 are also described in some detail in the references hereinabove cited and incorporated by reference. In the illustrated embodiment, multiple trolleys 50 are used.

Herein, a reference numeral refers to a particular type or class of item that can be named. A reference numeral followed by a trailing letter refers to a specific instance of the numbered item. Accordingly, it is proper to use a number without a trailing letter to indicate a particular type of item or class of item. A number used with a specific trailing letter indicates a particular instance of the item, so identified in a figure.

A trolley 50*a* contains a lever arm 52. Along that lever arm 52 a slide 54 may move. Typically, the slide 54 may actually have rollers or bearings that travel along a top surface of the lever arm 52. In this way, the slide 54 is quite free to move with a minimum of frictional resistance along the lever arm 52. Because the lever arm 52 is free to pivot about the axle 91*b* with respect to the track line 20, the lever arm 52 forces the pad 59 of a brake system 58 to engage frictionally against a lower side or surface of the track line 20.

Because the slide 54 is comparatively free to move along the lever arm 52, a rider 45 may suspend in a harness 46 from the trolley 50*a*. Meanwhile, a system of carabiners 49 and slings 55, such as the sling 55*a*, will suspend a harness 46 with a rider 45 seated or otherwise supported therein.

By means of a tether 56, effectively a small diameter cable 56, a rider 45 may pull on a handle 57, thus drawing along the lever arm 52 the slide 54, which is connected to the other end of the tether 56. A user 45 exerting no force on the handle 57 is effectively supported exclusively by the harness 46, sling 55*a*, and a connecting link 49, such as a carabiner 49, to the trolley 50*a*. Accordingly, the slide 54 when free from force by a user 45, with no force being exerted on the handle 57 and tether 56, tends to depress the lever arm 52, and thus slide forward along the lever arm 52, increasing the leverage advantage of the weight of the user applied to the slide 54 by moving away from the axle 91*b*.

For example, as the slide 54 moves toward the front end of the lever arm 52, the leverage that the weight of a user applies to the brake system 58 is increased. One can see that the brake system 58 pivots to a position exerting force and pressure by the pad 59 against the track line 20 as the lever arm 52 pivots about an axle 91*b* or bolt 91*b* under the influence of the weight of a rider on the hanger 54 or slide 54.

Movement downward by the lever arm 52 results in movement upward by the brake system 58. With force and movement downward by the slide 54 against the lever arm 52, force and movement upward apply the brake system 58 against the track line 20.

A shoe 59 or pad 59 operates to slide along the track line 20, subject the force of friction. Perhaps more specifically, the pad 59 or shoe 59 applies force against the track line 20. Meanwhile, the weight of a rider 45 in a harness 46 tends to draw or urge the trolley 50 to roll downward along the decline of the track line 20.

According to the rule of frictional engagement ($F=\mu N$), the drag force "F" of friction is proportional to the force applied normal (perpendicular) to the surface of the track line 20 by the brake pad 59 or brake shoe 59. Thus, the resistance "F" or the force "F" resisting movement of the trolley 50 along the decline of the track line 20 is equal to a coefficient of friction $\mu$ (a constant, $\mu$, related to the materials of the track line 20 and the pad 59) multiplied by the "normal" force "N" (meaning perpendicular load) applied to the contact surface of the track line 20 by the pad 59.

In the illustrated embodiment, the wheel 62 or pulley 62 supports the trolley 50 on the line 20. The wheel 62 may be braked in any of a number of ways. In some embodiments, a mechanical brake pad 59 or shoe 59 operates to provide friction against the track line 20. In other embodiments, the wheel 62 may be provided with an armature, and the brake system 58 may actually provide eddy current braking or induced current braking.

For example, the wheel 62 or pulley 62 may resist rolling. To do so, it may act like a motor that is being run in reverse or forced in reverse even though it is rolling or running forward along the line 20. Thus, the wheel 62 may operate as a motor being forced backward, thereby tending to provide a braking force.

Alternatively, the pulley 62 may be connected to, or be configured as an armature or stator operating as part of a generator generating a current. The generator may be connected to a load or resistance, which then dissipates the energy, thus providing the mechanical drag for the brake system 58. Such electromagnetic braking systems may often simply rely on the reverse or the inverse of the operation of motors.

If the wheel 62 operates as a part of a generator system, then the drag resisting rotation of the wheel 62 is a result of an electrical load connected to the generator system. Direct generation of eddy currents and dissipation thereof may also be relied upon as explained and understood in the electro-mechanical engineering arts. Eddy current braking herein is used in that context and relying on an ordinary engineering definition.

In another embodiment, braking may be applied to a wheel 62 mechanically. The wheel rolls substantially without slipping along the track line 20. It may be braked hydraulically, mechanically, or electrically, in order to resist rotation of the wheel 62.

One will note that several slings 55 are arranged in the various embodiments illustrated. Typically, a harness 46 contains webbing 64 in important locations. In fact, the harness 46 may look more like a seat 46, or may be more sparse, with leg loops, waist belt, and so forth as described and illustrated hereinabove.

For example, in certain embodiments, a harness 46 may involve a chest harness with the leg loops and a waist belt. A harness 46 that includes leg loops, a waist belt, and chest strap or harnessing is a good idea for novices and children. It may be connected to maintain a rider 45 upright without requiring action by the rider 45. A set of slings 55 interconnected by links 49, such as carabiners 49, may connect a harness 46 containing a rider 45 to a slide 54 that operates as a bracket 54 to support the harness 46 by the sling 55 under a trolley 50.

One should note that the idler 73 is a roller 73 that does not necessarily engage constantly during travel of a trolley 50 along a track line 20. Typically, a user 45 relieves the braking force by pulling the handle 57, thereby releasing pressure by the pad 59 against the track line 20 as described and illustrated hereinabove. Pulling down on the handle 57 draws the tether 56, connected to the slide 54. The slide 54 moves backward along the lever arm 52, changing the leverage advantage of the slide 54 against the brake system 58.

In the illustrated embodiments, the brake pad 59 makes a mechanical, frictional, braking action. In other embodiments, either a brake pad 59 may be used, or the wheel 62, itself, may be braked electromagnetically or otherwise, as discussed hereinabove.

However, in contrast, the idler 73 rides above the track line 20 without supporting any load, nor even necessarily making contact with the track line 20. As part of the braking system 58 of the trolley 50, the idler 73 need only engage if the braking system 58 moves away from the track line 20 sufficiently downward for the idler 73 to be required to restrain the trolley 50 from tilting further.

The trolley 50 includes various axles 91 supporting the idler 73, and so forth. In particular, an axle 91a supports the idler 73. The axle 91b supports the lever arm 52 pivoting below the main roller 62.

Again, a trolley 50a may be provided with a lever arm 52, a brake system 58, and proper connection systems including carabiners 49, slings 55, harness 46, and so forth. Thus, an individual user may travel down a track line 20 applying the braking force of the brake pad 59 against the track line 20 at will. However, a second trolley 50b may also be connected on the line 20 to travel simultaneously with the trolley 50a. In fact, multiple trolleys 50b may connect ahead, behind, or both, with respect to a braked trolley 50a.

Figure 18:
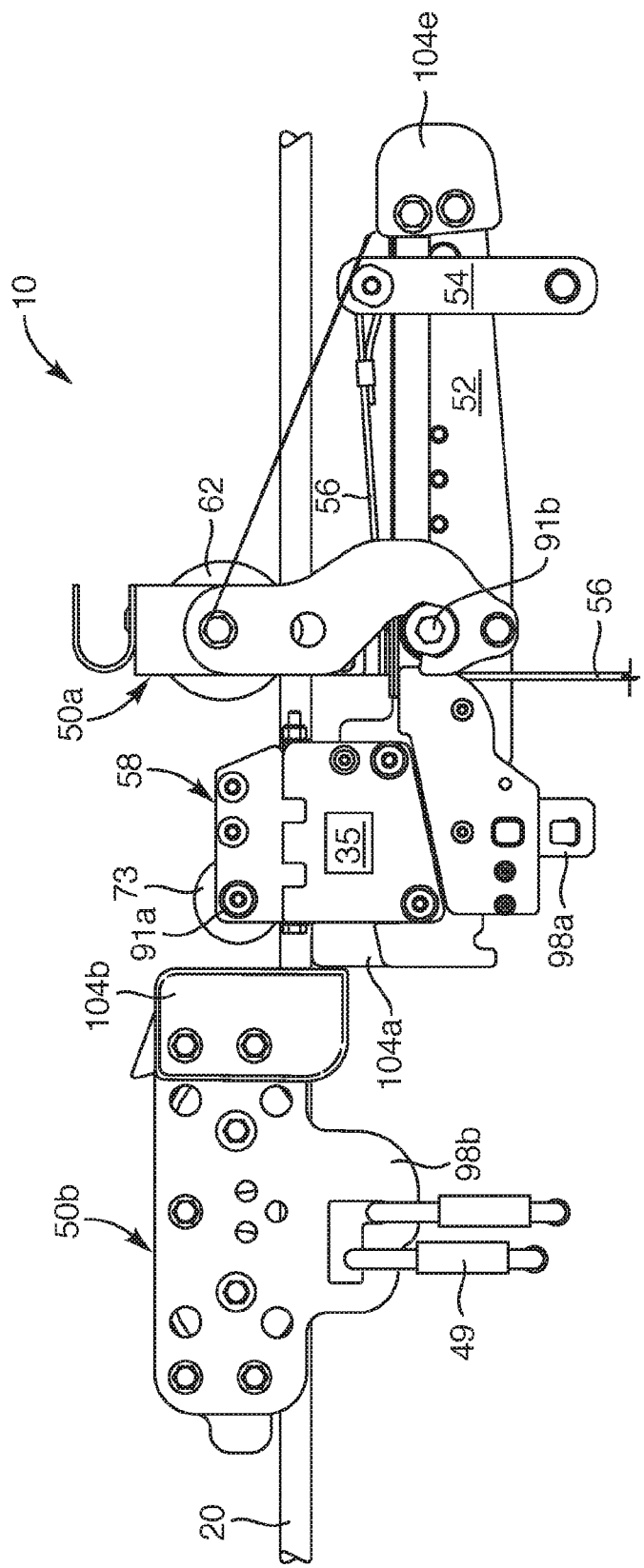
FIG. 18 is a right side elevation view thereof, with the two trolleys engaged and in contact to operate together.

Referring to FIG. 18, the trolley 50b may include a hanger 98b corresponding to the hanger 98a on the trolley 50a. For the rider of the trolley 50a, the hanger 98a acts as a belay hanger 98a. That is, the harness 46 of the rider 45 of the trolley 50a is suspended from the lever arm 52 by the slide 54 and sling 55a.

In contrast, the trolley 50b needs no brake. In fact, it should have no brake. Otherwise, coordination and control between the trolleys 50a, 50b would be difficult, and the risk of impact unsafe.

For safety, the hanger 98b on the trolley 50b may be connected to the hanger 98a of the trolley 50a by a sling 55f. In general, a harness 46 of a rider 45 of the trolley 50a may be suspended by a sling 55a. Meanwhile, a sling 55e, connects between the harness 46a of the rider of the trolley 50a and the belay hanger 98a. Thus, the belay hanger 98a operates to provide an additional sling 55e, in the unlikely event that any failure occurs in the slide 54, its connecting carabiner 49, or the sling 55a. Likewise, should any failure in the arm 52 occur, the rider is still suspended by the trolley 50a through the belay hanger 98a and sling 55e.

Referring to FIGS. 19 through 21, and FIGS. 1 through 21 generally, a rider 45 in a harness 46b may be secured by a sling 55f that eliminates the possibility of escape by the trolley 50b from the trolley 50a. Thus, the riders under the trolley 50a, 50b are linked together by the sling 55f. The sling 55f also operates as a belay sling 55f, providing additional connection through a carabiner 49 to the sling 55f on the harness 46b.

The sling 55b suspends the harness 46b of a second rider from a hanger 98b. In the event of a failure of any aspect of the second trolley 50b, the sling 55f provides a suspension of the harness 46b from the belay hanger 98a.

A bumper 104b on the trolley 50b may or may not have any equivalent necessary on the trolley 50a. For example, an unbraked trolley 50b does not need the lever arm 52. The trolley 50a may have a bumper 104a for contacting the bumper 104b, if desired, however, By whatever mode, a bumper 104b on the trolley 50b connects to contact the trolley 50a, thereby minimizing any potential for damage, abrupt contact between metals, or the like. Typically, the bumpers 104 may be formed of rubber, a suitable polymer, or the like.

Meanwhile, the bumpers 104*b*, 104*c*, 104*d* correspond to the unbraked trolleys 50*b*, 50*c*, 50*d*. For example, multiple trolleys 50*a*, 50*b*, 50*c*, 50*d* may operate in tandem at the same time on the same run along the track line 20. Meanwhile, the brake system 58 on the first trolley 50*a* operates to brake all the trolleys 50.

Figure 19:
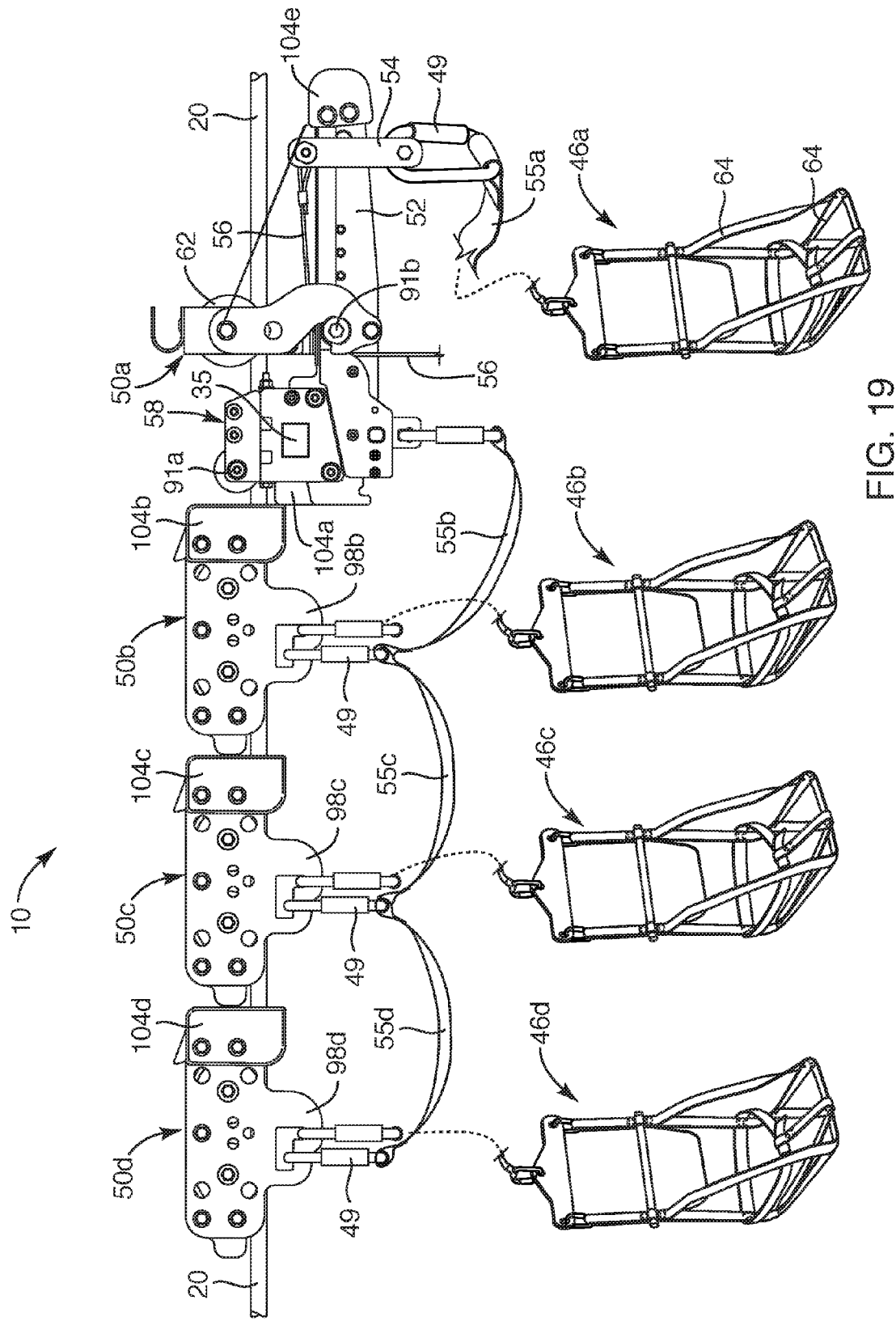
FIG. 19 is a right side elevation view of a system wherein a single braking trolley is operated to brake a series of unbraked trolleys running therebehind.

Referring to FIG. 19, the three unbraked trolleys 50*b*, 50*c*, 50*d* are bumpered together and against the trolley 50*a*, which leads. The braking system 58 of the first trolley 50*a* or lead trolley 50*a* has the effect of controlling (effectively slowing or braking) all the trolleys 50*a*, 50*b*, 50*c*, 50*d*.

Another bumper 104*e* on the front of the lever arm 52 of the trolley 50*a* serves another purpose. This is bumper 104*e* for systems that may attenuate speed at the lower end or landing end of a run along the track line 20.

Figure 20:
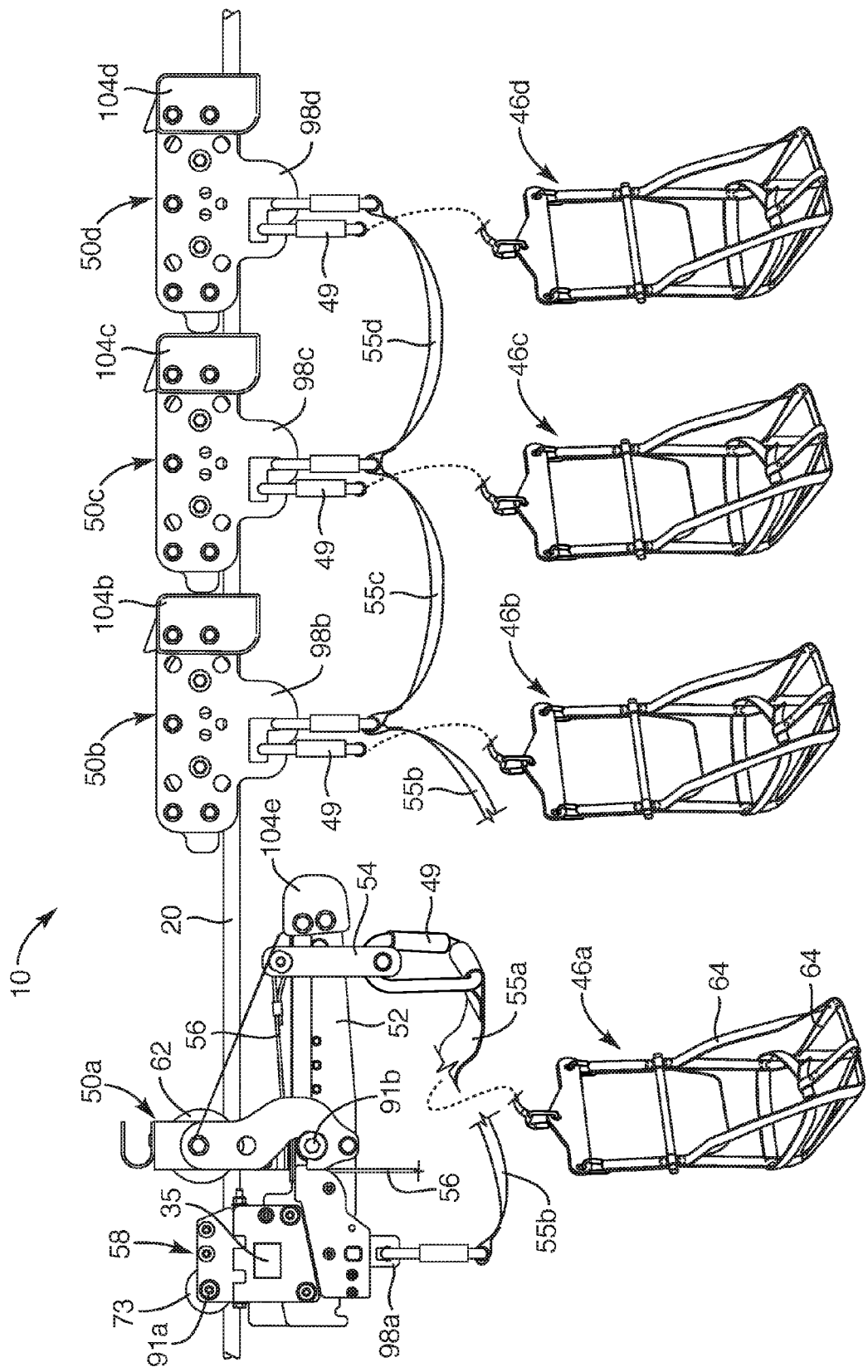
FIG. 20 is a right side elevation view of a system of trolleys, wherein a braked trolley trails behind multiple unbraked trolleys connected thereto and running in front thereof.

Referring to FIG. 20, in yet another embodiment, the trolleys 50*b*, 50*c*, 50*d* may be connected to run ahead of the trolley 50*a*. In this embodiment, the slings 55*a*, 55*b*, 55*c*, 55*d* support each of the harnesses 46*a*, 46*b*, 46*c*, 46*d* under their respective trolleys 50*a*, 50*b*, 50*c*, 50*d*. Meanwhile, the slings 55*f*, 55*g*, 55*h* connect together the trolleys 50*a*, 50*b*, 50*c*, 50*d*. However, here, the trolleys 50*b*, 50*c*, 50*d* do not stack up behind the trolley 50*a*, but run ahead of it. Accordingly, they will typically separate by the distance permitted by their interconnections, slings 55*f*, 55*g*, 55*h*.

Regardless, the trolleys 50*a*, 50*b*, 50*c*, 50*d* cannot separate by a great distance. That distance is dictated by the interconnecting slings 55*f*, 55*g*, 55*h*. Accordingly, no great variation, or even significant difference, in velocity is obtained or attainable, relatively speaking, between any of the trolleys 50. Thus the risk of instability or inter-trolley impact is reduced to have virtually no effect.

Figure 21:
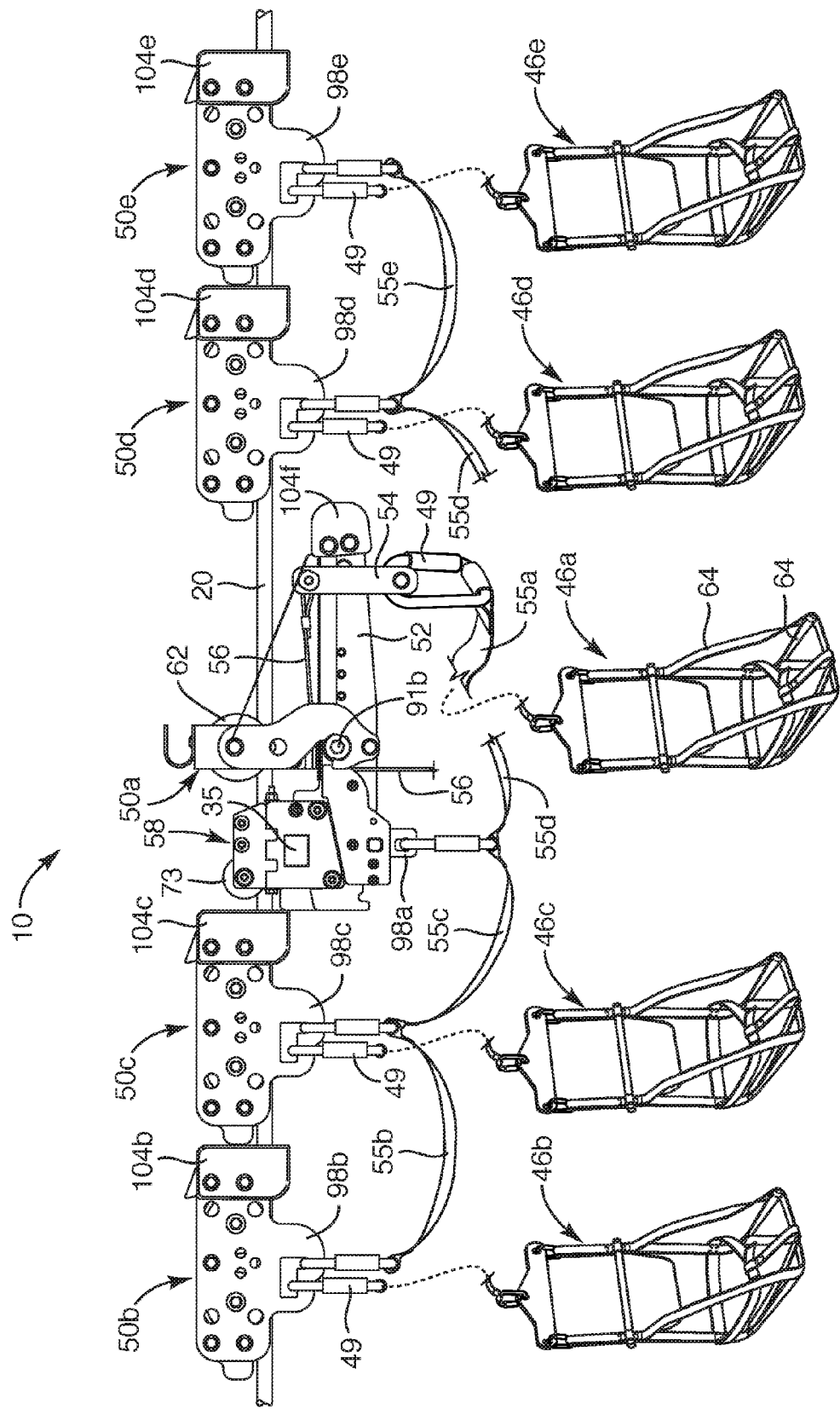
FIG. 21 is a right side elevation view of a braked trolley having unbraked trolleys running both ahead and behind, connected to be controlled by operation of the braked trolley.

Referring to FIG. 21, in one embodiment, multiple trolleys 50*b* may be distributed to both trail behind and run ahead of the lead trolley 50*a*. One or more may be connected behind, while other trolleys 50*c*, 50*d* may also be connected ahead of the trolley 50*a*.

In some respects, it may easier to operate if all the additional trolleys 50*b*, 50*c*, 50*d* are either in front of or behind. With all unbraked trolleys 50*b*, 50*c*, 50*d* located exclusively either fore or aft, the rider on the trolley 50*a* has a single direction to pay attention to riders. This may be a more secure mode of care with respect to the unbraked trolleys 50*b*, 50*c*, 50*d*, with the operator of the braking trolley 50*a* knowing all other riders are either behind or in front.

It appears that having all riders of unbraked trolleys 50*b*, 50*c*, 50*d* behind the braked trolley 50*a*, the controlling rider 45 of the trolley 54*a* is free to look forward upon approaching the end of a particular leg of a track line 20. On the other hand, with all unbraked trolleys 50*b*, 50*c*, 50*d* ahead of the controlling trolley 50*a*, the controlling rider 45 need only look forward at any time to see both the approaching attenuation system and all riders. On the other hand, trolleys 50*b*, 50*c*, 50*d* carrying riders in front of the controlling trolley 50*a* may tend to spread out while descending, but move together upon arriving at an end-of-line attenuation system, as described and shown in the references incorporated above by reference.

The present invention may be embodied in other specific forms without departing from its purposes, functions, structures, or operational characteristics. The described embodiments are to be considered in all respects only as illustrative, and not restrictive. The scope of the invention is, therefore, indicated by the appended claims, rather than by the foregoing description. All changes which come within the meaning and range of equivalency of the claims are to be embraced within their scope.

What is claimed and desired to be secured by United States Letters Patent is:

1. A method of operating a zip line, the method comprising:
   providing a track line suspended between an upper tower and a lower tower corresponding thereto;
   providing a first trolley comprising a roller running along the track line and a brake effective to control the speed of the first trolley; and
   providing a second trolley;
   suspending a first rider from the first trolley and a second rider from the second trolley;
   connecting the second trolley to the first trolley;
   controlling the speed of descent of the second trolley by the brake through the connection between the first trolley and second trolley.

2. The method of claim 1, further comprising positioning the second trolley behind the first trolley.

3. The method of claim 2, further comprising positioning a third trolley behind the first trolley.

4. The method of claim 1, further comprising:
   positioning a plurality of second trolleys behind the first trolley; and
   operating simultaneously the first trolley and plurality of second trolleys.

5. The method of claim 4, further comprising:
   operating the plurality of second trolleys; and
   relying exclusively on the brake to control the speed of the plurality of second trolleys.

6. The method of claim 1, further comprising providing a second trolley, connected to the first trolley to operate in front of the first trolley.

7. The method of claim 6, further comprising:
   providing a plurality of second trolleys, at least one of which operates in front of the first trolley, being connected thereto, to be braked exclusively during descent along the track line by operation of the brake on the first trolley.

8. A method of operating a zip line, the method comprising:
   providing a track line suspended between an upper tower and a lower tower corresponding thereto;
   providing a first trolley comprising a roller running along the track line and a brake effective to control the speed of the first trolley; and
   providing at least one second trolley;
   suspending a first rider from the first trolley and a second rider from the second trolley;
   connecting the at least one second trolley to the first trolley;
   controlling the speed of descent of the at least one second trolley by the brake through the connection between the first trolley and second trolley.

9. The method of claim 8, further comprising positioning the at least one second trolley adjacent the first trolley.

10. The method of claim 9, further comprising positioning the at least one second trolley behind the first trolley.

11. The method of claim 9, further comprising positioning a plurality of the second trolleys to operate with the first trolley and simultaneously on the track line.

12. The method of claim 8, further comprising providing at least one third trolley, connected to operate on an opposite end of the at least one first trolley, with respect to a direction along the track line, from the plurality of trolleys.

13. The method of claim 8, further comprising:
providing a plurality of second trolleys, at least one of which operates in front of the first trolley and at least another thereof which operates behind the first trolley, and all of the first, second, and third trolleys being interconnected to be braked exclusively during simultaneous descent thereof along the track line by operation of the brake on the first trolley.

14. An apparatus operating as a zip line system, the apparatus comprising:
a suspension system comprising an upper tower, a lower tower, a track line suspended therebetween, a first station containing a platform proximate the upper tower, and a second station under the track line proximate the second tower;
a first trolley comprising a brake operable during descent thereof along the suspension system, the first trolley being selectively removable from and attachable to the track line; and
at least one second trolley operably connectable to the track line to descend therealong proximate to and simultaneously with the first trolley, the at least one second trolley being operably controlled during the descent by operation of the first trolley.

15. The apparatus of claim 14, further comprising a mechanical interlock on the first trolley effective to limit operation of the first trolley on the track line based upon an open condition and closed condition of the first trolley with respect to the track line.

16. The apparatus of claim 14, wherein the at least one second trolley is connected to the first trolley to descend therewith under exclusive control of the first trolley.

17. The apparatus of claim 14, wherein the at least one second trolley is suspended from the track line uphill from the first trolley during descent thereof.

18. The apparatus of claim 14, wherein the at least one second trolley is suspended from the track line downhill from the first trolley during descent thereof.

19. The apparatus of claim 14, wherein the at least one second trolley comprises at least two second trolleys connected to the first trolley to descend therewith at opposite ends thereof.

* * * * *